United States Patent
Szabo

(10) Patent No.: US 8,433,997 B1
(45) Date of Patent: *Apr. 30, 2013

(54) EFFICIENT PORTABLE DOCUMENT

(75) Inventor: Peter Szabo, Zurich (CH)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/848,787

(22) Filed: Aug. 2, 2010

Related U.S. Application Data

(60) Provisional application No. 61/230,681, filed on Jul. 31, 2009.

(51) Int. Cl.
*G06F 17/00* (2006.01)

(52) U.S. Cl.
USPC ............ 715/209; 715/205; 715/235; 707/693

(58) Field of Classification Search .................... 715/209
See application file for complete search history.

(56) References Cited

U.S. PATENT DOCUMENTS

| | | | | |
|---|---|---|---|---|
| 7,478,324 | B1* | 1/2009 | Ohtsu | 715/255 |
| 2006/0187478 | A1* | 8/2006 | Kongtcheu et al. | 358/1.13 |
| 2007/0271288 | A1* | 11/2007 | Martin et al. | 707/101 |

OTHER PUBLICATIONS

Fazekas ("pdfsizeopt.py" published Mar. 29, 2009 by "pts@fazekas.hu", as an open source on the WWW pp. 1-87.*
Peter Zabo "Conversion of TeX font into Type 1 format" Published 2001 pp. 1-18.*
Reidar ("A DVI preview in Java" published Nov. 1, 2006 by "University of Oslo" 112 pages).*
Bienz et al. ("Portable Document Format Reference Manual"Version 1.2 dated Nov. 2, 1996 by Adobe System Incorporated, 394 pages).*
Phelps et al. ("Two diet plan for fat PDF" dated Nov. 20-22, 2003 by ACM, 10 pages).*
Adobe, "Adobe Acrobat Pro 9," 2009, 1 page.
Adobe, "PDF Reference Sixth Edition-Portable Document Format," version 1.7, 2006, available at http://www.adobe.com/devnet/pdf/pdf_reference_archive.html, 1310 pages.
Adobe, "The Compact Font Format Specification," 1.0 edition, 2003, available at http://www.adobe.com/devnet/font/pdfs/5176.CFF.pdf, 62 pages.
"Adobe Acrobat 8.0 Professional—Optimizing PDF Files," 2009, Website Optimization, LLC., 15 pages.
Apago, Inc. "PDF Enhancer—Automate the Assembly, Preparation and Optimization of PDF for Print, Web and Archiving," 2005, 2 pages.
Apago, Inc. "PDF Enhancer—Which features are in what PDF enhancer edition?" 2009, 4 pages.
Cho et al. "The DVIPDFMx Project," 2011, available at http://tug.org/texlive/devsrc/Build/source/texk/xdvipdfmx/, 10 pages.

(Continued)

*Primary Examiner* — Cesar Paula
*Assistant Examiner* — Quoc A Tran
(74) *Attorney, Agent, or Firm* — Fish & Richardson P.C.

(57) ABSTRACT

A computer-implemented method for formatting electronic documents involves obtaining, at a computer system, an electronic document in a source format. The process also involves processing the electronic document by optimizing sizes of one or more images embedded in the electronic document, optimizing sizes of one or more Type 1 fonts in the electronic document, and removing object duplicates in the electronic document. In addition, the process involves generating the document in a target format based on the processing.

23 Claims, 3 Drawing Sheets

OTHER PUBLICATIONS

CodeMantra—Digital Publishing Made Manageable. "Universal PDF," 2002-2012, 2 pages.
"Compressing your PDF files," very.PDF.com, Inc., 2006, available at http://www.verypdf.com/pdfinfoeditor/pdfcompress.htm, 6 pages.
"DjVu: A Tutorial," available at http://www.djvuzone.org/support/tutorial/chapter-intro.html, 1998-2000, 3 pages.
Fowler. "Linux/BSD/Mac OS X ports of Ken Silverman's Utilities," 2007, available at http://www.jonof.id.au/kenutils, 3 pages.
Gimp.org. "Gimp2.6—Release Notes," 2001-2011, available at http://www.gimp.org/, 14 pages.
"JBIG2," 2012, GitHub Inc., available at www.jpeg.org/public/fcd14492.pdf, 2 pages.
Koenig, "Creative use of PDF files in latex environments: What Adobe won't tell you . . . ," Chemnitz University of Technology, Department of Computer Science, 2004, pp. 1-30.
Lizardtech. "DjVu," djvu v3 edition, 2005, available at http://djvu.org/docs/JfVu3Spec.djvu, 70 pages.
PackJPG. "Latest Binary Releases of PackJPG: V2.3," 2007, 1 page.
"PDF Compress Command Line User Manual," very.PDF.com, Inc., 2006, available at http://www.verypdf.com/pdfinfoeditor/pdfcompress.htm, 4 pages.
"PDF Creator—The free PDF Creator and Converter," available at pdfforge.org, 2012, 1 page.
Phelps and Watry. "A No-Compromises Architecture for Digital Document Preservation," Proceedings of the $9^{th}$ European Conference on Research and Advanced Technology for Digital Libraries (ECDL 2005), 2005, 12 pages.
Phelps and Wilensky. "Two Diet Plans for Fat PDF." DocEng 03', 2003, ACM, 10 pages.
Phelps. Sourceforge.net. "Multivalent," 2011, available at http://multivalent.sourceforge.net/index.html, 1 page.
Phelps. Compact PDF Specification, 2004, available at http://multivalent.sourceforge.net/Research/CompactPDF.html, 3 pages.
Phelps. "Compress—the multivalent pdf compression tool," 2009, available at http://multivalent.sourceforge.net/Tools/pdf/Compress.html, 4 pages.
Phelps. "Multivalent download location," 2009, available at http://sourceforge.net/projects/multivalent/files/, 1 page.
"PSTricks website—PDF export," 2012, available at http://tug.org/PSTricks/main.cgi?file=pdf/pdfoutput, 11 pages.
Rahtz. "The pdfTeX user manual," 2007, available at http://sarovar.org/projects/pdftex/, 45 pages.
Rokicki. "Dvips: A DVI-to-PostScript Translator—manual for version 5.96," 2007, 65 pages.
Silverman. "Ken Silverman's Utility Page—Compression Utilities," 1993, available at http://www.advsys.net/ken/utils.htm, 11 pages.
Skala, "How to concatenate PDFs without pain," 2008, available at http://ansuz.sooke.bc.ca/software/pdf-apend.php, 4 pages.
Still. Stillhq.com. "PDF Database," 2005, available at mikal@stillhq.com, 17 pages.
Szabo. "Sam2p," available at http://pts.szit.bme.hu/sam2p/, 4 pages.
Szabo. "Example PDF files the PDF size optimizers were tested with," 2009, 1 page.
Szabo. "Extra files—pdfsizeopt and PDF file size optimizer," 2011, available at http://code.google.com/p/pdfsizeopt/source/browse/#svn/trunk/extra, 1 page.
Szabo. "Inserting figures into TeX documents," Proceedings of the 2001 Annual Meeting, *TUGboat*, 2001, in EuroBachoTeX 2002, pp. 1001-1007.
Szabo. "Installation instructions," 2011, available at http://code.google.com/p/pdfsizeopt/wiki/InstallationInstructions, 2 pages.
Szabo. "pdfsizeopt," 2011, 1 page.
Tantau. "The Tikz and PGF Packages—Manual for Version 2.10," 2008, available at http://sourceforge.net/projects/pgf, 726 pages.
Tantau. "User Guide to the Beamer Class—Manual for version 3.07," 2007, available at http://latex-beamer.sourceforge.net, 224 pages.
Truta. Sourceforge.net. "A guide to PNG optimization," 2008, available at http://optipng.sourceforge.net/pngtech/optipng.html, 9 pages.
Truta. Sourceforge.net. "OptiPNG: Advanced PNG Optimizer," 2009, available at http://optipng.sourceforge.net/, 3 pages.
Virtanen. "textext—Inkscape," 2009, available at http://www.elisanet.fi/ptvirtan/software/textext/, 2 pages.
White. "PostScript-to-PDF converter," 2008, available at http://ghostscript.com/doc/current/Ps2pdf.htm, 16 pages.
Wikipedia.org. "OptiPNG," 2006, available at http://en.wikipedia.org/wiki/OptiPNG, 2 pages.
Øksnevad, Reidar; *A DVI Previewer in Java*, published Nov. 1, 2006, University of Oslo, 112 pages.

\* cited by examiner

EFFICIENT PORTABLE DOCUMENT

CROSS-REFERENCE TO RELATED APPLICATIONS

This application claims priority to U.S. Provisional Application Ser. No. 61/230,681, filed on Jul. 31, 2009, entitled "Efficient Portable Document," the entire contents of which are hereby incorporated by reference.

TECHNICAL FIELD

This document discusses features for formatting of documents in an efficient format, such a reformatting of TeX documents into the well-known portable document format (PDF) format.

BACKGROUND

Much has changed in the world of publishing and communication since the release of TeX in 1982. TeX was rapidly adopted by mathematicians and physicists as a much-loved document preparation system, although with a steep learning curve. It is also used in other specialist areas, such as technical documentation and database publishing.

Since the 1990's, computer power and networking have grown many times, as has the use of computers. People are looking to the internet, particularly the Web, for information, services and solutions. Although TeX remains mainstream for mathematical content, as open-source software it has slipped, and its web presence is weak. TeX-related websites are somewhat dated and developer communities isolated, compared to the organizations that were accepted. In contrast, the PDF (or portable document format) system is very popular and growing in popularity. Many users, including users who are not technically proficient, have computers that include PDF readers, so that one user can provide other users with a PDF document and expect that those other users will be able to review it.

SUMMARY

There are several tools discussed here for generating PDF output from a TEX document. By choosing the appropriate tools and configuring them properly, it is possible to reduce the PDF output size by a factor of three or even more, thus reducing document download times, hosting, and archiving costs. This document discusses the most common tools, and explains how to configure them to reduce the size of text, fonts, images, and cross-reference information that is embedded into the final PDF. The document also analyzes image compression in detail.

The document presents a tool called pdfsizeopt.py, which optimizes the size of embedded images and Type 1 fonts, and removes object duplicates. The document also discusses a workflow for PDF size optimization, which involves configuration of TEX tools, running pdfsizeopt.py, and the Multivalent PDF compressor as well.

In one implementation, a computer-implemented method for formatting electronic documents is disclosed. The method comprises obtaining, at a computer system, an electronic document in a source format; processing the electronic document by optimizing sizes of one or more images embedded in the electronic document, optimizing sizes of one or more Type 1 fonts in the electronic document, and removing object duplicates in the electronic document; and generating the document in a target format based on the processing.

In certain aspects, the target format is an optimized version of the source format. Also, the source format and the target format may both be portable document format (PDF). In addition, the obtained electronic document can be a previously-optimized electronic document. Moreover, the source document can be in a TEX format and the target document can be in a portable document format (PDF) format. In yet other aspect, processing the electronic document can comprise executing pdfsizeopt.py on the electronic document. In yet other implementations, systems and recordable media are disclosed for executing and storing instructions for performing such operations.

Other features are discussed below in the context of particular embodiments.

DETAILED DESCRIPTION

Figure 1:
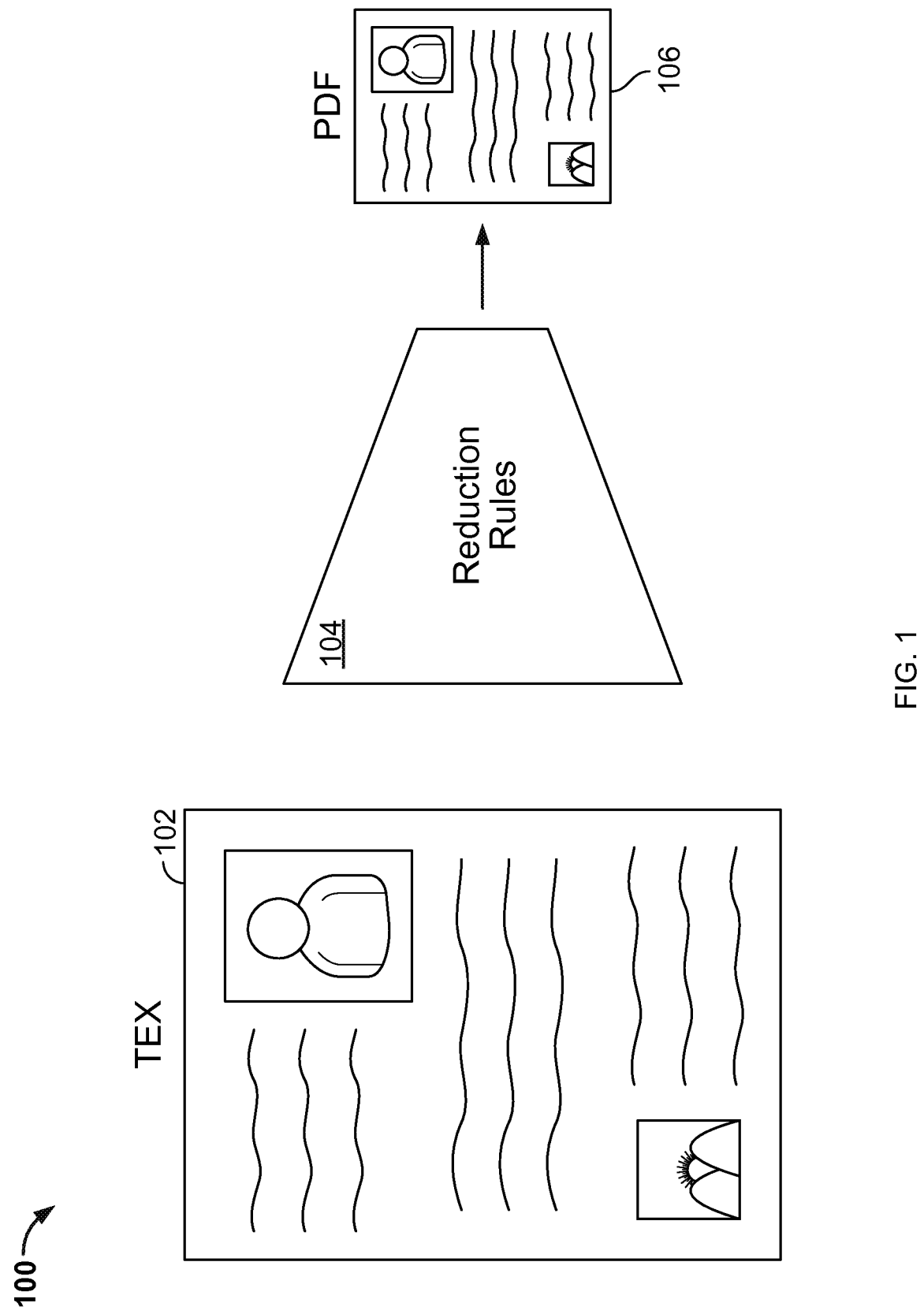
FIG. 1 shows a process for converting a document from TEX format to PDF format in a reduced size.

1.1 What does a PDF Document Contain

PDF is a popular document file format designed for printing and on-screen viewing. PDF faithfully preserves the design elements of the document, such as fonts, line breaks, page breaks, exact spacing, text layout, vector graphics and image resolution. Thus the author of a PDF document has precise control over the document's appearance—no matter what operating system or renderer software is used for viewing or printing the PDF. From the viewer's perspective, a PDF document is a sequence of rectangular pages that contain text, vector graphics, and pixel-based images. In addition, some rectangular page regions can be marked as hyperlinks, and Unicode annotations can also be added to the regions, so text may be copy-pasted from the documents. (Usually, the copy-paste yields only a sequence of characters, with all formatting and positioning lost. Depending on the software and the annotation, the bold and italics properties can be preserved.) A tree-structured table of contents can be added as well, with each node in the tree consisting of an unformatted caption and a hyperlink within the document.

Additional features of PDF include forms (the user fills some fields with data, clicks on the submit button, and the data is sent to a server in an HTTP request), event handlers in JavaScript, embedded multimedia files, encryption and access protection.

PDF has almost the same 2D graphics model (text, fonts, colors, vector graphics) as does PostScript, one of the most widespread page description and printer control language. So it is possible to convert between PDF and PostScript without loss of information, except for a few constructs, e.g., transparency and color gradients are not supported by PostScript. Conversion from PDF to PostScript may increase the file size if there are many repetitions in the PDF (e.g., a logo drawn to each page). Some of the interactive features of PDF (such as forms, annotations and bookmarks) have no PostScript equivalent either; other nonprintable elements (such as hyperlinks and the document outline) are supported in PostScript using pdfmark, but many PDF-to-Post-Script converters just ignore them.

1.2 How to create PDF

Because PDF contains little or no structural and semantic information (such as in which order the document should be read, which regions are titles, how the tables are built and how the charts are generated), word processors, drawing programs, and typesetting systems usually can export to PDF, but for loading and saving they keep using their own file format which preserves semantics. PDF is usually not involved while the author is composing (or typesetting) the document, but once a version of a document is ready, a PDF can be exported and distributed. Should the author distribute the document in the native file format of the word processor, the author might risk that the document doesn't get rendered as he or she intended, due to software version differences or because slightly different fonts are installed on the rendering computer, or the page layout settings in the word processor are different.

Most word processors and drawing programs and image editors support exporting as PDF. It is also possible to generate a PDF even if the software does not have a PDF export feature. For example, it may be possible to install a printer driver, which generates PDF instead of sending the document to a real printer. (For example, on Windows, PDFCreator is such an open-source driver.) Some old programs can emit PostScript, but not PDF. The ps2pdf tool (part of Ghostscript) can be used to convert the PostScript to PDF.

There are several options for PDF generation from TEX documents, including pdfTEX, dvipdfmx and dvips+ps2pdf. Depending on how the document uses hyperlinks and PostScript programming in graphics, some of these may not work satisfactorily. (See the details in Subsection 2.1.).

FIG. 1 shows a process 100 for converting a document from TEX format to PDF format in a reduced size. In general, the process 100 begins with a source TEX-based document, though the document can take other starting formats consistent with the steps for processing the document that are described here. The TEX document 102 can range from a simple text-based document to a document having various embedded images and other complex objects in it. The TEX document 102 can have been created and managed previously via any of a variety of publicly-available TEX editors and may be saved in a standard file format that follows typical standards for TEX-based documents.

A document reducer 104 is shown processing the TEX document 102 in order to create a PDF document 106 that has similar visual attributes to the TEX document 102. The document reducer 104 executes a number of document reduction processes, which may be implemented as step-wise rules (some of which may be performed in a particular order and some of which may be performed in any appropriate order). Such rules may include the processing of particular elements in a document, such as images. The rules may also specify parameters for common operations such as compression, where the parameters have been selected to optimize compression for a document of the type like TEX document 102. In addition, the rules may include running various standard document conversions in particular orders, such as by using publicly-available document converters in series, and applying the output of one to the input of the next, until the PDF document 106 is created.

Figure 2:
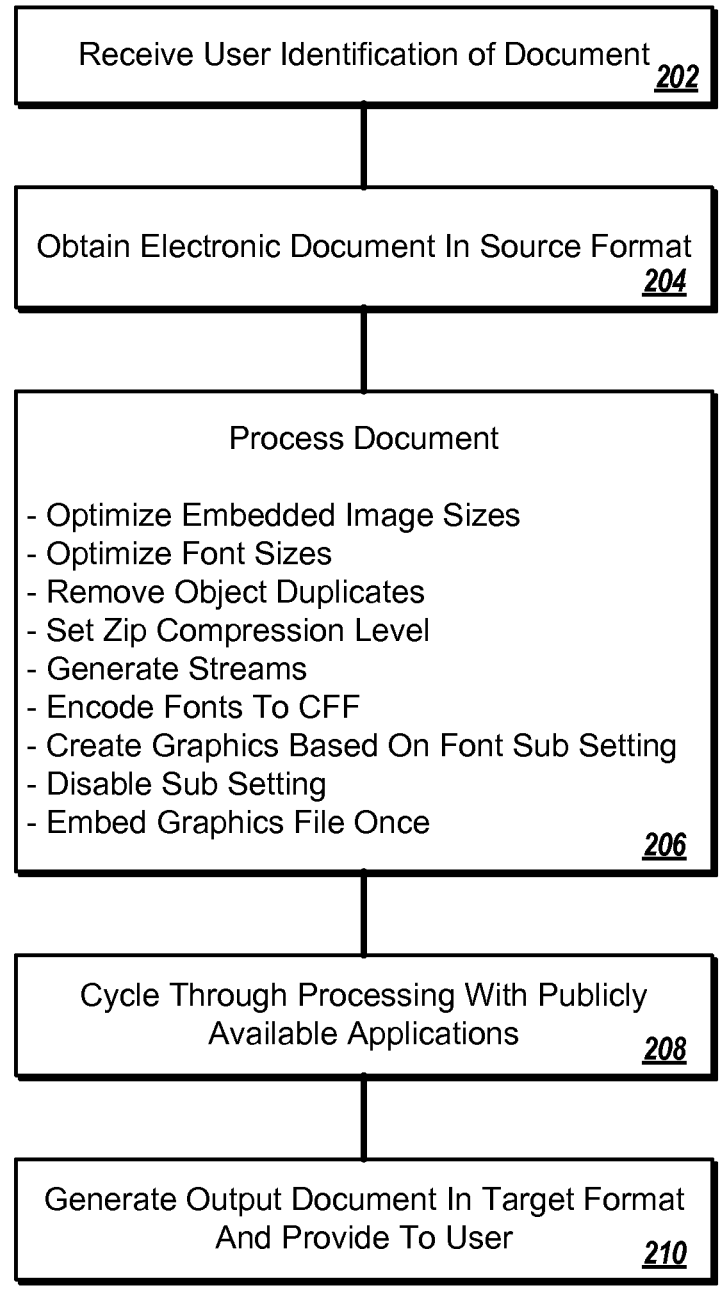
FIG. 2 is a process for converting a document while providing a reduced size for the document.

FIG. 2 is a process 200 for converting a document while providing a reduced size for the document. In general, the process 200 involves identifying a document that has been selected by a user, and performing a series of predefined operations in sequence on the electronic representation of the document. The converted document may then be provided for use, such as by providing it to the user, where the user can save or email the document to a recipient.

The process begins at box 202, where the process receives a user identification of a document. Such identification may occur by various well-known mechanisms, such as by a user indicating an intent to have a document converted, having a file selection dialogue box displayed to the user, and then received a user selection of a source file in the dialogue box.

At box 204, the process obtains the electronic representation of the document in its source format, such as a TEX format. The document at this point may be partially or wholly loaded from permanent memory, for example, to temporary memory so that it can be processed more efficiently, and can be loaded quickly to a microprocessor that may have loaded commands, also stored in memory, for converting the document.

At box 206, the process, operating on one or more processors in a computer system, processes the document, to convert it to another format and to cause it to have a reduced storage size in that target format. Various steps may be taken in such processing, such as optimizing (which comprises substantially maximizing or minimizing to the ability of the system, though it does not require perfect maximizing or minimizing) embedded images sizes, optimizing font sizes, and removing object duplicates. Also, where compression such as ZIP is to be performed, an appropriate compression level may be set automatically for the process, or a predetermined level may be applied. Streams may also be generated for the document, and graphics may be created based on font subsetting. Also, subsetting of certain types may be disabled as described in more detail below, and graphics files may be embedded only a single time rather than multiple times for the document.

At box 208, publicly available applications are run on the file for converting and/or reducing its size. Such applications may be run as part of a script so that the execution occurs automatically from the viewpoint of the users. The running of the applications may preceded or follow one or all of the actions discussed with respect to box 206, or may be executed instead of the actions in box 206.

At box 210, an output document is generated that reflects the application of the various transformation operations, and the file is provided to the user. For example, the user may be presented with a file manager dialogue box for saving the file, which may be in a format such as PDF.

1.3 Motivation for Making PDF Files Smaller

The goal of the features in this document is to reduce the size of PDF files, focusing, in particular embodiments, on those created from TEX documents (though the features discussed here may be applicable more generally in certain implementations). Having smaller PDF files reduces download times, web hosting costs, and storage costs. Although there is no urgent need for reducing PDF storage costs for personal use (since hard drives in modern PCs are large enough), storage costs are significant for publishing houses, print shops, e-book stores and hosting services, libraries and archives. Usually lots of copies and backups are made of PDF files originating from such places, so that saving 20% of the file size right after generating the PDF would save 20% of all future costs associated with the file.

Although e-book readers can store lots of documents (e.g., a 4 GB e-book reader can store 800 PDF books of 5 MB average reasonable file size), they get full quickly if we don't pay attention to optimized PDF generation. One can easily get a PDF file 5 times larger than reasonable by generating it with software which doesn't pay attention to size, or not setting the export settings properly. Upgrading or changing the generator software is not always feasible. A PDF re-compressor becomes useful in these cases.

It is not our goal in these particular embodiments to propose or use alternative file formats, which support a more compact document representation or more aggressive compression than PDF. An example for such an approach is the Multivalent compact PDF file format, see Section 5 for more details. There is no technical reason against using a compact format for storage, and converting it on-the-fly to a regular PDF before processing if needed. The disadvantage of a non-standard compact format is that most PDF viewers and tools will not support it by default, so the user has to install and run the conversion tool, which some users can't or won't do just for viewing a PDF. When archiving compact PDF files for a long term, it can be important to make sure that a working converter will exist at restore time. With Multivalent, this is possible by archiving the .jar file that contains the code of the converter. But this may not suit all needs, because Multivalent is not open source, there appear to be no alternative implementations, and there is no open specification for its compact PDF file format.

A Pixel-Based (Fixed Resolution) Alternative of PDF is DjVu (See Section 5).

It is possible to save space in a PDF by removing non-printed information such as hyperlinks, document outline elements, forms, text-to-Unicode mapping or user annotations. Removing these does not affect the output when the PDF is printed, but it degrades the user experience when the PDF is viewed on a computer, and it may also degrade navigation and searchability. Another option is to remove embedded fonts. In such a case, the PDF viewer will pick a font with similar metrics if the font is not installed on the viewer machine. Please note that unembedding the font doesn't change the horizontal distance between glyphs, so the page layout will remain the same, but maybe glyphs will look funny or hard-to-read. Yet another option to save space is to reduce the resolution of the embedded images. We will not use any of the techniques mentioned in this paragraph, because our goal is to reduce redundancy and make the byte representation more effective, while preserving visual and semantic information in the document.

1.4 PDF File Structure

It is possible to save space in the PDF by serializing the same information more effectively and/or using better compression. This section gives a high-level introduction to the data structures and their serialization in the PDF file, focusing on size optimization. For a full description of the PDF file format.

PDF supports integer, real number, boolean, null, string and name as simple data types. A string is a sequence of 8-bit bytes. A name is also a sequence of 8-bit bytes, usually a concatenation of a few English words in CamelCase, often used as a dictionary key (e.g. /MediaBox) or an enumeration value (e.g., /DeviceGray). Composite data types are the list and the dictionary. A dictionary is an unordered sequence of key-value pairs, where keys must be names. Values in dictionaries and list items can be primitive or composite. There is a simple serialization of values to 8-bit strings, compatible with PostScript LanguageLevel 2. For example, <</Integer 5/Real -6.7/Null null
    /StringInHex <Face> /String ((C)2009\\))
    /Boolean true /Name /Foo /List [3 4 5]>>
defines a dictionary with values of various types. All data types are immutable.

It is possible to define a value for future use by defining an object. For example, 12 0 obj [/PDF /Text] endobj defines object number 12 to be an array of two items (/PDF and /Text).

The number 0 in the definition is the so-called generation number, signifying that the object has not been modified since the PDF was generated. PDF makes it possible to store old versions of an object with different generation numbers, the one with the highest number being the most recent. Because most of the tools just create a new PDF instead of updating parts of an existing one, we can assume for simplicity that the generation number is always zero. Once an object is defined it is possible to refer to it (e.g. 12 0 R) instead of typing its value. It is possible to define self-referential lists and dictionaries using object definitions. The PDF specification requires some PDF structure elements (such as the /FontDescriptor value) be an indirect reference, i.e. defined as an object. Such elements cannot be inlined into other object, but they must be referred to.

A PDF file contains a header, a list of objects, a trailer dictionary, cross-reference information offsets of object definitions, sorted by object number), and the end-of-file marker. The header contains the PDF version (PDF-1.7 being the latest). All of the file elements above except for the PDF version, the list of objects and the trailer are redundant, and can be regenerated if lost. The parsing of the PDF starts at the trailer dictionary. Its /Root value refers to the catalog dictionary object, whose /Pages value refers to a dictionary object containing the list of pages. The interpretation of each object depends on the reference path which leads to that object from the trailer. In addition to that, dictionary objects may have the /Type and/or /Subtype value indicating the interpretation. For example, <</Subtype/Image . . . >> defines a pixel-based image.

In addition to the data types above, PDF supports streams as well. A stream object is a dictionary augmented by the stream data, which is a byte sequence. The syntax is X Y obj <<dict-items>> stream stream-data endstream endobj. The stream data can be compressed or otherwise encoded (such as in hex). The /Filter and /Decode. Parms values in the dictionary specify how to uncompress/ decode the stream data. It is possible the specify multiple such filters, e.g./Filter [/ASCII. HexDecode /FlateDecode] says that the bytes after stream should be decoded as a hex string, and then uncompressed using PDF's ZIP implementation. The three most common uses for streams are: image pixel data, embedded font files and content streams. A content stream contains the instructions to draw the contents of the page. The stream data is ASCII, with a syntax similar to PostScript, but with different operators. For example, BT/F 20 Tf 1 0 0 1 8 9 Tm(Hello world)Tj ET draws the text "Hello World" with the font /F at size 20 units, shifted up by 8 units, and shifted right by 9 units (according to the transformation matrix 1 0 0 1 8 9).

Streams can use the following generic compression methods: ZIP (also called flate), LZW and runlength encoding. ZIP is almost always superior. In addition to those, PDF supports some image-specific compression methods as well: JPEG and JPEG2000 for true-color images and JBIG2 and G3 fax (also called as CCITT fax) for bilevel (two-color) images. JPEG and JPEG2000 are lossy methods, they usually yield the same size at the same quality settings—but JPEG2000 is more flexible. JBIG2 is superior to G3 fax and ZIP for bilevel images. Any number of compression filters can be applied to a stream, but usually applying more than one yields a larger compressed stream size than just applying one. ZIP and LZW support predictors as well. A predictor is an easy-to-compute, invertible filter which is applied to the stream data before compression, to make the data more compressible. One possible predictor subtracts the previous data value from the current one, and sends the difference to the compressor. This helps reducing the file size if the difference between adjacent data values is small most of the time. This is true for some images with a small number of colors.

There is cross-reference information near the end of the PDF file, which contains the start byte offset of all object definitions. Using this information it is possible to render parts of the file, without reading the whole file. The most common format for cross-reference information is the cross-reference table (starting with the keyword xref). Each item in the table consumes 20 bytes, and contains an object byte offset. The object number is encoded by the position of the item. For PDFs with several thousand objects, the space occupied by the cross-reference table is not negligible. PDF1.5 introduces crossreference streams, which store the cross-reference information in compact form in a stream. Such streams are usually compressed as well, using ZIP and a predictor. The benefit of the predictor is that adjacent offsets are close to each other, so their difference will contain lots of zeros, which can be compressed better.

Compression cannot be applied to the PDF file as a whole, only individual parts (such as stream data and cross-reference information) can be compressed. However, there can be lots of small object definitions in the file which are not streams. To compress those, PDF1.5 introduces object streams. The data in an object stream contains a concatenation of any number of non-stream object definitions. Object streams can be compressed just as regular stream data. This makes it possible to squeeze repetitions spanning over multiple object definitions. Thus, with PDF1.5, most of the PDF file can be stored in compressed streams. Only a few dozen header bytes and end-of-file markers and the stream dictionaries remain uncompressed.

2 Making PDF Files Smaller 2.1 How to Prepare a Small, Optimizable PDF with TEX

When aiming for a small PDF, it is possible to get it by using the best tools with the proper settings to create the smallest possible PDF right ahead. Another approach is to create a PDF without paying attention to the tools and their settings, and then optimize PDF with a PDF size optimizer tool. The approach we suggest in this paper is a mixture of the two: pay attention to the PDF generator tools and their fundamental settings, so generating a PDF which is small enough for temporary use and also easy to optimize further; and use an optimizer to create the final, even smaller PDF.

This section enumerates the most common tools that can generate the temporary PDF from a .tex source. As part of this, it explains how to enforce the proper compression and font settings, and how to prepare vector and pixel-based images so they don't become unnecessarily large.

Pick the Best PDF Generation Method

Table 2 lists features of the 3 most common methods (also called as drivers) which produce a PDF from a TEX document, and Table 1 compares the file size they produce when compiling the TEXbook. There is no single best driver because of the different feature sets, but looking at how large the output of dvips is, the preliminary conclusion would be to use pdfTEX or dvipdfm(x) except if advanced PostScript features are needed (such as for psfrag and pstricks). We continue with presenting and analyzing the methods mentioned.

dvips This approach converts TEX source→DVI→PostScript→PDF, using dvips for creating the PostScript file, and ps2pdf (part of Ghostscript) for creating the PDF file. Example command-lines for compiling doc.tex to doc.pdf:

$ latex doc
$ dvips doc
$ ps2pdf14 -dPDFSETTINGS=/prepress doc.ps dvipdfmx The tool dvipdfmx converts from DVI to PDF, producing a very small output file. dvipdfmx is part of TEXLive 2008, but since it's quite new, it may be missing from other TEX distributions. Its redecssor, dvipdfm has not been updated since March 2007. Notable new features in dvipdfmx are: support for non-latin scripts and fonts; emitting the Type 1 fonts in CFF (that's the main reason for the size difference in Table 2); parsing pdfTEX-style font .map files. Example command-lines:

$ latex doc
$ dvipdfmx doc pdftex The commands pdftex or pdflatex generate PDF directly from the .tex source, without any intermediate files. An important advantage of pdfTEX over the other methods is that it integrates nicely with the editors TEXShop and TEXworks. The single-step approach ensures that there would be no glitches (e.g. images misaligned or not properly sized) because the tools are not integrated properly. Examplecommand-line:

$ pdflatex doc

The command latex doc is run for both dvips and dvipdfm (x). Since these two drivers expect a bit different \specials in the DVI file, the driver name has to be communicated to the TEX macros generating the \specials. For LATEX, dvips is the default. To get dvipdfm(x) right, pass dvipdfm (or dvipdfmx) as an option to \documentclass or to both \usepackage{graphicx} and \usepackage. {hyperref}. The package pts-graphics-helper sets up dvipdfm as default unless the document is compiled with pdflatex.

Unfortunately, some graphics packages (such aspsfrag and pstricks) require a PostScript backend such as dvips, and pdfTEX or dvipdfmx don't provide that. See Workarounds for PDF output with the pstricks LATEX package. URL http://tug.org/ PSTricks/main.cgi?file=pdf/pdfoutput, for a list of workarounds. They rely on running dvips on the graphics, possibly converting its output to PDF, and then including those files in the main compilation. Most of the extra work can be avoided if graphics are created as external PDF files (without text replacements), TikZ figures or METAPOST figures. TikZ and METAPOST support text captions typeset by TEX. Inkscape users can use textext within Inkscape to make TEX typeset the captions.

The \includegraphics command of the standard graphicx LATEX-package accepts a PDF as the image file. In this case, the first page of the specified PDF will be used as a rectangular image. With dvipdfm(x), one also needs a .bb (or .bbx) file containing the bounding box. This can be generated with the ebb tool (or the extractbb tool shipping with dvipdfm(x). Or, it is possible to use the ptsgraphics-helper package, which can find the PDF bounding box directly (most of the time).

dvipdfm(x) contains special support for embedding figures created by METAPOST. For pdfTEX, the graphicx package loads supp-pdf.tex, which can parse the output of METAPOST, and embed it to the document. Unfortunately, the graphicx package is not smart enough to recognize METAPOST output files (jobname.1, jobname.2 etc.) by extension. The pts-graphics-helper package overcomes this limitation by defining \includegraphicsmps, which can be used in place of \includegraphics for including figures created by METAPOST. The package works consistently with dvipdfm(x) and pdfTEX.

With pdfTEX, it is possible to embed page regions from an external PDF file, using the pdfpages LATEX-package. Please note that due to a limitation in pdfTEX, hyperlinks and outlines (table of contents) in the embedded PDF will be lost. Although dvipdfm(x) supports PNG and JPEG image inclusion, calculating the bounding box may be cumbersome. It is recommended that all external images should be converted to PDF first. The recommended software for that conversion is sam2p, which creates a small PDF (or EPS) quickly. Considering all of the above, we recommend using pdfTEX for compiling TEX documents to PDF. If, for some reason, using pdfTEX is not feasible, we recommend dvipdfmx from TEX-Live 2008 or later. If a 1% decrease in file size is worth the trouble of getting fonts right, we recommend dvipdfm. In all the cases above, the final PDF should be optimized with pdfsizeopt.py (see later).

Get rid of complex graphics Some computer algebra programs and vector modeling tools emit very large PDF (or similar vector graphics) files. This can be because they draw the graphics using too many little parts (e.g. they draw a sphere using several thousand triangles), or they draw too many parts which would be invisible anyway since other parts cover them. Converting or optimizing such PDF files usually doesn't help, because the optimizers are not smart enough to rearrange the drawing instructions, and then skip some of them. A good rule of thumb is that if a figure in an optimized PDF file is larger than the corresponding PNG file rendered in 600 DPI, then the figure is too complex. To reduce the file size, it is recommended to export the figure as a PNG (or JPEG) image from the program, and embed that bitmap image.

Downsample high-resolution images For most printers it doesn't make a visible difference to print in a resolution higher than 600 DPI. Sometimes even the difference between 300 DPI and 600 DPI is negligible. So converting the embedded images down to 300 DPI may save significant space without too much quality degradation. Downsampling before the image is included is a bit of manual work for each image, but there are lot of free software tools to do that (such as GIMP and the convert tool of ImageMagick imagemagick). It is possible to downsample after the PDF has been created, for example with the commercial software PDF Enhancer or Adobe Acrobat. ps2pdf (using Ghostscript's -dDEVICE=pdfwrite, and setdistillerparams to customize can read PDF files, and downsample images within as well, but it usually grows other parts of the file too much (15% increase in file size for The TEXbook), and it may lose some information (it does keep hyperlinks and the document outline, though).

Crop large images If only parts of a large image contain useful and relevant information, one can save space by cropping the image.

Choose the JPEG quality When using JPEG (or JPEG2000) compression, there is a tradeoff between quality and file size. Most JPEG encoders based on libjpeg accept an integer quality value between 1 and 100. For true color photos, a quality below 40 produces a severely degraded, hard-to-recognize image, with 75 we get some harmless glitches, and with 85 the degradation is hard to notice. If the document contains lots of large JPEG images, it is worth reencoding those with a lower quality setting to get a smaller PDF file. PDF enhancer can reencode JPEG images in an existing PDF, but sometimes not all the images have to be reencoded. With GIMP it is possible to get a realtime preview of the quality degradation before saving, by moving the quality slider. Please note that some cameras don't encode JPEG files effectively when saving to the memory card, and it is possible to save a lot of space by reencoding on the computer, even with high quality settings.

Optimize poorly exported images Not all image processing programs pay attention to size of the image file they save or export. They might not use compression by default; or they compress with suboptimal settings; or (for EPS files) they try to save the file in some compatibility mode, encoding and compressing the data poorly; or they add lots of unneeded metadata. These poorly exported images make TEX and the drivers run slow, and they waste disk space (both on the local machine and in the revision control repository). A good rule of thumb to detect a poorly exported image is to use sam2p to convert the exported image to JPEG and PNG (sam2p -c ijg:85 exported.img test.jpg; sam2p exported.img test.png), and if any of these files is a lot smaller than the exported image, then the image was exported poorly.

Converting the exported image with sam2p (to any of EPS, PDF, JPEG and PNG) is a fast and effective way to reduce the exported image size. But sam2p with its default settings, doesn't create the smallest possible file, but it runs very quickly, and it creates an image file which is small enough to be embedded in the temporary PDF.

Embed vector fonts instead of bitmap fonts Most fonts used with TEX nowadays are available in Type 1 vector format. (These fonts include the Computer Modern families, the Latin Modern families, the URWversions of the base 14 and some other Adobe fonts, the TEX Gyre families, the Vera families, the Palatino family, the corresponding math fonts, and some symbol and drawing fonts.) This is a significant shift from the original TEX (+dvips) concept, which used bitmap fonts generated by META-FONT. While drivers still support embedding bitmap fonts to the PDF, this is not recommended, because bitmaps (at 600 DPI) are larger than their vector equivalent, they render more slowly and they look uglier in some PDF viewers.

If a font is missing from the font .map file, drivers tend to generate a bitmap font automatically, and embed that. To make sure this didn't happen, it is possible to detect the presence of bitmap fonts in a PDF by running grep -a "/Subtype */Type3" doc.pdf. Here is how to instruct pdfTEX to use bitmap fonts only (for debugging purposes): pdflatex "\pdfmapfile\input" doc The most common reason for the driver not finding a corresponding vector font is that the .map file is wrong or the wrong map file is used. With TEXLive, the updmap tool can be used to regenerate the .map files for the user, and the updmap-sys command regenerates the system-level .map files. Table 3 shows which driver reads which .map file. Copying over pdftex dl14.map to the current directory as the driver-specific .map file usually makes the driver find the font. Old TEX distributions had quite a lot of problems finding fonts, upgrading to TEXLive 2008 or newer is strongly recommended. Some other popular fonts (such as the Microsoft web fonts) are available in TrueType, another vector format. dvipdfm(x) and pdfTEX can embed True-Type fonts, but dvips cannot (it just dumps the .ttf file to the .ps file, rendering it unparsable). OpenType fonts with advanced tables for script and feature selection and glyph substitution are supported by Unicode-aware TEX-derivatives such as X ETEX, and also by dvipdfmx.

Omit the base 14 fonts The base 14 fonts are Times (in 4 styles, Helvetica (in 4 styles), Courier (in 4 styles), Symbol and Zapf Dingbats. To reduce the size of the PDF, it is possible to omit them from the PDF file, because PDF viewers tend to have them. However, omitting the base 14 fonts is deprecated since PDF1.5. Adobe Reader 6.0 or newer, and other PDF viewers (such as xpdf and evince) don't contain those fonts either, but they can find them as system fonts. On Debian-based Linux systems, those fonts are in the gsfonts package.

In TEXLive, directives pdftexDownloadBase14 and dvipdfmDownloadBase14 etc. in the configuration file texmf-config/web2c/updmap.cfg specify whether to embed the base 14 fonts. After modifying this file (either the system-wide or the one in $HOME/.texlive2008) and running the updmap command, the following font map files would be created:

pdftex_dl14.map Font map file for pdfTEX with the base 14 fonts embedded. This is the default.

pdftex_ndl14.map Font map file for pdfTEX with the base 14 fonts omitted.

pdftex.map Font map file used by pdfTEX by default. Identical to one of the two above, based on the pdftexDownloadBase14 setting.

dvipdfm_dl14.map Font map file for dvipdfm(x) with the base 14 fonts embedded. This is the default.

dvipdfm_ndl14.map Font map file for dvipdfm(x) with the base 14 fonts omitted.

dvipdfm.map Font map file used by dvipdfm(x) by default. Identical to one of the two above, based on the dvipdfmDownloadBase14 setting.

It is possible to specify the base 14 embedding settings without modifying configuration files or generating .map files. Example command-line for pdfTEX (type it without line breaks):

pdflatex "\pdfmapfile{pdftex_ndl14.map}
\input" doc.tex

However, this will display a warning "No flags specified for non-embedded font". To get rid of this, use pdflatex "\pdfmapfile{=
pdftex_ndl14_extraflag.map}
\input" doc.tex instead. Get the .map file from Extra files related to PDF generation and PDF size optimization. URL http://code.google.com/p/pdfsizeopt/source/browse/#svn/trunk/extra.

The .map file syntax for dvipdfm is different, but dvipdfmx can use a .map file of pdfTEX syntax, like this:

dvipdfmx -f pdftex_dl14.map doc.dvi

Please note that dvipdfm loads the .map files specified in dvipdfmx.cfg first, and the .map files loaded with the -f flag override entries loaded previously, from the configuration file. To have the base 14 fonts omitted, run (without a line break):

dvipdfmx -f pdftex_ndl14.map
-f dvipdfmx_ndl14_extra.map doc.tex

Get the last .map file from Extra files related to PDF generation and PDF size optimization. URL http://code.google.com/p/pdfsizeopt/source/browse/#svn/trunk/extra. Without dvipdfmx . ndl14 extra.map, a bug in dvipdfm prevents it from writing a PDF file without the font—it would embed a rendered bitmap font instead.

Subset fonts Font subsetting is the process when the driver selects and embeds only the glyphs of a font which are actually used in the document. Font subsetting is turned on by default for dvips, dvipdfm(x) and pdfTEX when emitting glyphs produced by TEX.

2.2 Extra Manual Tweaks on TEX-to-PDF Compilation

This sections shows a couple of methods to reduce the size of the PDF created by a TEX compilation manually. It is not necessary to implement these methods if the temporary PDF gets optimized by pdfsizeopy.py+Multivalent, because this combination implements the methods discussed here.

Set the ZIP compression level to maximum For pdfTEX, the assignment \pdfcompresslevel9 select maximum PDF compression. With TEXLive 2008, this is the default. Here is how to specify it on the command-line (without line breaks):

pdflatex "\pdfcompresslevel9
\input" doc.tex

For dvipdfm(x), the command-line flag -z9 can be used to maximize compression. This is also the default. PDF itself supports redundancy elimination in many different places (see in Subsection 2.3) in addition to setting the ZIP compression level. There is no need to pay attention to this tweak, because Multivalent recompresses all ZIP streams with maximum effort.

Generate object streams and cross-reference streams pdfTEX can generate object streams and cross-reference streams to save about 10% of the PDF file size, or even more if the file contains lots of hyperlinks. (The actual saving depends on the file structure.) Example command-line for enabling it (without line breaks):

pdflatex "\pdfminorversion5
\pdfobjcompresslevel3
\input" doc.tex

If ZIP compression is used to compress the object streams, in some rare cases it is possible to save space by starting a new block within the ZIP stream just at the right points. There is no need to pay attention to this tweak, because Multivalent generates object streams and cross-reference streams by default.

Encode Type 1 fonts as CFF CFF (Type 2 or /Subtype /Type1C) is an alternative, compact, highly compressible binary font format that can represent Type 1 font data without loss. By embedding vector fonts in CFF instead of Type 1, one can save significant portion of the PDF file, especially if the document is 10 pages or less (e.g. reducing the PDFfile size from 200 kB to 50 kB). dvipdfmx does this by default, the other drivers (pdfTEX, dvipdfm, ps2pdf with dvips) don't support CFF embedding so far. There is no need to pay attention to this tweak, because pdfsizeopt.py converts Type 1 fonts in the PDF to CFF.

Create graphics with font subsetting in mind For glyphs coming from external sources such as the included PostScript and PDF graphics, the driver is usually not smart enough to recognize the fonts already embedded, and unify them with the fonts in the main document. Let's suppose that the document contains included graphics with text captions, each graphics source PostScript or PDF having the font subsets embedded. No matter dvips, dvipdfm(x) or pdfTEX is the driver, it will not be smart enough to unify these subsets to a single font. Thus space would be wasted in the finally PDF file containing multiple subsets of the same font, possibly storing duplicate versions of some glyphs. It is possible to avoid this waste by using a graphics package implemented in pure TEX (such as TikZ) or using METAPOST (for which there is special support in dvips, dvipdfm(x) and pdfTEX to avoid font and glyph duplication). The package psfrag doesn't suffer from this problem either if the EPS files don't contain any fonts embedded.

There is no need to pay attention to this tweak, because pdfsizeopt.py unifies font subsets.

Disable font subsetting before concatenation If a PDF document is a concatenation of several smaller PDF files (such as in journal volumes and conference proceeding), and each PDF file contains its own, subsetted fonts, then it depends on the concatenator tool whether those subsets are unified or not. Most concatenator tools (pdftk, Multivalent, pdfpages, ps2pdf) don't unify these font subsets.

However, if you use ps2pdf for PDF concatenation, you can get font subsetting and subset unification by disabling font subsetting when generating the small PDF files. In this case, Ghostscript (run by ps2pdf) will notice that the document contains the exact same font many times, and it will subset only one copy of the font.

There is no need to pay attention to this tweak, because pdfsizeopt.py unifies font subsets.

Embed each graphics file once When the same graphics file (such as the company logo on presentation slides) is included multiple times, it depends on the driver whether the graphics data is duplicated in the final PDF. pdfTEX doesn't duplicate, dvipdfm(x) duplicates only METAPOST graphics, and dvips always duplicates.

There is no need to pay attention to this tweak, because both pdfsizeopt.py and Multivalent eliminate duplicates of identical objects.

2.3 How PDF Optimizers Save Space

This subsection describes some methods PDF optimizers use to reduce the file size. We focus on ideas and methods relevant to TEX documents.

Use cross-reference streams compressed with the y-predictor Each offset entry in an (uncompressed) cross-reference table consumes 20 bytes. It can be reduced by using compressed cross-reference streams, and enabling the y-predictor. As shown in column xref of Table 4, a reduction factor of 180 is possible if the PDF file contains many objects (e.g. more than 105 objects in pdfref, with less than 12000 bytes in the cross-reference stream).

The reason why the y-predictor can make a difference of a factor of 2 or even more is the following. The y-predictor encodes each byte in a rectangular array of bytes by subtracting the original byte above the current byte from the current byte. So if each row of the rectangular array contains an object offset, and the offsets are increasing, then most of the bytes in the output of the y-predictor would have a small absolute value, mostly zero. Thus the output of the y-predictor can be compressed better with ZIP than the original byte array.

Some tools such as Multivalent implement the y-predictor with PNG predictor 12, but using TIFF predictor 2 avoids stuffing in the extra byte per each row—pdfsizeopt.py does that.

Use object streams It is possible to save space in the PDF by concatenating small (non-stream) objects to an object stream, and compressing the stream as a whole. One can even sort objects by type first, so similar objects will be placed next to each other, and they will fit to the 32 kB long ZIP compression window.

Please note that both object streams and crossreference streams are PDF1.5 features, and crossreference streams must be also used when object streams are used.

Use better stream compression In PDF any stream can be compressed with any compression filter (or a combination of filters). ZIP is the most effective general-purpose compression, which is recommended for compressing content streams, object streams, cross-reference streams and font data (such as CFF). For images, however, there are specialized filters (see later in this section).

Most PDF generators (such as dvipdfm(x) and pdfTEX) and optimization tools (such as Multivalent) use the zlib code for general-purpose ZIP compression. zlib lets the user specify the effort parameter between 0 (no compression) and 9 (slowest compression, smallest output) to balance compression speed versus compressed data size. There are, however alternative ZIP compressor implementations (such as the one in KZIP and PNGOUT), which provide an even higher effort—but the author doesn't know of any PDF optimizers using those algorithms.

Recompress pixel-based images PDF supports more than 6 compression methods (and any combination of them) and more than 6 predictors, so there are lots of possibilities to make images smaller. Here we focus on lossless compression (thus excluding JPEG and JPEG2000 used for compressing photos). An image is rectangular array of pixels. Each pixel is encoded as a vector of one or more components in the color space of the image. Typical color spaces are RGB (/DeviceRGB), grayscale (/Device. Gray), CMYK (/DeviceCMYK), color spaces where colors are device-independent, and the palette (indexed) versions of those. Each color component of each pixel is encoded as a nonnegative integer with a fixed number of bits (bits-per-component, BPC; can be 1, 2, 4, 8, 12 or 16). The image data can be compressed with any combination of the PDF compression methods.

Before recompressing the image, usually it is worth extracting the raw RGB or CMYK (or device independent) image data, and then compressing the image the best we can. Partial approaches such as optimizing the palette only are usually suboptimal, because they may be incapable of converting an indexed image to grayscale to save the storage space needed by the palette.

To pick the best encoding for the image, we have to decide which color space, bits-per-component, compression method(s) and predictor to use. We have to choose a color space which can represent all the colors in the image. We may convert a grayscale image to an RGB image (and back if all pixels are grayscale). We may also convert a grayscale image to a CMYK image (and maybe back). If the image doesn't have more than 256 different colors, we can use an indexed version of the color space. A good rule of thumb (no matter the compression) is to pick the color space+bits-per component combination which needs the least number of bits per pixel. On a draw, pick the one which doesn't need a palette. These ideas can also be applied if the image contains an alpha channel (which allows for transparent or semi-transparent pixels).

It is possible to further optimize some corner cases, for example if the image has only a single color, then it is worth encoding it as vector graphics filling a rectangle of that color. Or, when the image is a grid of rectangles, where each rectangle contains a single color, then it is worth encoding a lower resolution image, and increase the scale factor in the image transformation matrix to draw the larger image.

High-effort ZIP is the best compression method supported by PDF, except for bilevel (two-color) images, where JBIG2 can yield a smaller result for some inputs. JBIG2 is most effective on images with lots of 2D repetitions, e.g. images containing lots of text (because the letters are repeating). Other lossless compression methods supported by PDF (such as RLE, LZW and G3 fax) are inferior to ZIP and/or JBIG2. Sometimes the image is so small (like 10×10 pixels) that compressing would increase its size. Most of the images don't benefit from a predictor (used together with ZIP compression), but some of them do. PDF supports the PNG predictor image data format, which makes it possible to choose a different predictor for scanline (image row). The heuristic default algorithm in pnmtopng calculates all 5 scanline variations, and picks the one having the smallest sum of absolute values. This facilitates bytes which small absolute values in the uncompressed image data, so the Huffman coding in ZIP can compress it effectively.

Most of the time it is not possible to tell in advance if ZIP or JBIG2 should be used, or whether a predictor should be used with ZIP or not. To get the smallest possible output, it is recommended to run all 3 variations and pick the one yielding the smallest image object. For very small images, the uncompressed version should be considered as well. If the image is huge and it has lots repetitive regions, it may be worth to apply ZIP more than once. Please note that metadata (such as specifying the decompression filter(s) to use) also contributes to the image size.

Most PDF optimizers use the zlib code for ZIP compression in images. The output of some other image compressors (most notably PNGOUT, see also OptiPNG and for a list of 11 other PNG optimization tools) is smaller than what zlib produces with its highest effort, but those other compressors usually run a 100 times or even slower than zlib.

How much a document size decreases because of image recompression depends on the structure of the document (how many images are there, how large the images are, how large part of the file size is occupied by images) and how effectively the PDF was generated. The percentage savings in the image column of Table 4 suggests that only a little saving is possible (about 5%) if the user pays attention to embed the images effectively, according to the image related guidelines presented in Section 2.1. It is possible to save lots of space by decreasing the image resolution, or decreasing the image quality by using some lossy compression method (such as JPEG or JPEG2000) with lower quality settings. These kind of optimizations are supported by Adobe Acrobat Pro and PDF Enhancer, but they are out of scope of our goals to decrease the file size while not changing its rendered appearance.

JPEG files could benefit from a lossless transformation, such as removing EXIF tags and other metadata. Compressing JPEG data further with ZIP wouldn't save space. The program packJPG applies custom lossless compression to JPEG files, saving about 20%. Unfortunately, PDF doesn't have a decompression filter for that.

Convert some inline images to objects It is possible to inline images into content streams. This PDF feature saves about 30 bytes per image as compared to having the image as a standalone image object. However, inline images cannot be shared. So in order to save the most space, inline images which Optimizing PDF output size of TEX documents are used more than once should be converted to objects, and image objects used only once should be converted to inline images. Images having palette duplication with other images should be image objects, so the palette can be shared.

Unify duplicate objects If two or more PDF objects share the same serialized value, it is natural to save space by keeping only the first one, and modifying references to the rest so that they refer to the first one. It is possible to optimize even more by constructing equivalence classes, and keeping only one object per class. For example, if the PDF contains 5 0 obj << /Next 6 0 R /Prev 5 0 R >> endobj
6 0 obj << /Next 5 0 R /Prev 6 0 R >> endobj
7 0 obj << /First 6 0 R >> endobj then objects 5 and 6 are equivalent, so we can rewrite the PDF to 5 0 obj << /Next 5 0 R /Prev 5 0 R >> endobj
7 0 obj << /First 5 0 R >> endobj PDF generators usually don't emit duplicate objects on purpose, but it just happens by chance that some object values are equal. If the document contains the same page content, font, font encoding, image or graphics more than once, and the PDF generator fails to notice that, then these would most probably become duplicate objects, which can be optimized away. The method dvips+ps2pdf usually produces lots of duplicated objects if the document contains lots of duplicate content such as \includegraphics loading same graphics many times.

Remove image duplicates, based on visible pixel value Different color space, bits-per-pixel and compression settings can cause many different representations of the same image (rectangular pixel array) be present in the document. This can indeed happen if different parts of the PDF were created with different (e.g. one with pdfTEX, another with dvips), and the results were concatenated. To save space, the optimizer can keep only the smallest image object, and update references.

Remove unused objects Some PDF files contain objects which are not reachable from the /Root or trailer objects. These may be present because of incremental updates, concatenations or conversion, or because the file is a linearized PDF. It is safe to save space by removing those unused objects. A linearized PDF provides better web experience to the user, because it makes the first page of the PDF appear earlier. Since a linearized PDF can be automatically generated from a non-linearized one any time, there is no point keeping a linearized PDF when optimizing for size.

Extract large parts of objects Unifying duplicate objects can save space only if a whole object is duplicated. If a paragraph is repeated on a page, it will most probably remain duplicated, because the duplication is within a single object (the content stream). So the optimizer can save space by detecting content duplication in the sub-object level (outside stream data and inside content stream data), and extracting the duplicated parts to individual objects, which can now be unified. Although this extraction would usually be too slow if applied to all data structures in the PDF, it may be worth applying it to some large structures such as image palettes (whose maximum size is 768 bytes for RGB images).

Reorganize content streams and form XObjects Instructions for drawing a single page can span over multiple content streams and form XObjects. To save space, it is possible to concatenate those to a single content stream, and compress the stream at once. After all those concatenations, large common instruction sequences can be extracted to form XObjects to make code reuse possible.

Remove unnecessary indirect references The PDF specification defines if a value within a compound PDF value must be an indirect reference. If a particular value in the PDF file is an indirect reference, but it doesn't have to be, and other objects are not referring to that object, then inlining the value of the object saves space. Some PDF generators emit lots of unnecessary indirect references, because they generate the PDF file sequentially, and for some objects they don't know the full value when they are generating the object—so they replace parts of the value by indirect references, whose definitions they give later. This strategy can save some RAM during the PDF generation, but it makes the PDF about 40 bytes larger than necessary for each such reference.

Convert Type 1 fonts to CFF Since drivers embed Type 1 fonts to the PDF as Type 1 (except for dvipdfmx, which emits CFF), and CFF can represent the same font with less bytes (because of the binary format and the smart defaults), and it also and more compressible (because it doesn't have encryption), it is natural to save space by converting Type 1 fonts in the PDF to CFF.

Subset fonts This can be done by finding unused glyphs in fonts, and getting rid of them. Usually this doesn't save any space for TEX documents, because drivers subset fonts by default.

Unify subsets of the same font As discussed in Section 2.1, a PDF file may end up containing multiple subsets of the same font when typesetting a collection of articles (such as a journal volume or a conference proceedings) with LATEX, or embedding graphics containing text captions. Since these subsets are not identical, unifying duplicate objects will not collapse them to a single font. A font-specific optimization can save file size by taking a union of these subsets in each font, thus eliminating glyph duplication and improving compression effectiveness by grouping similar data (font glyphs) next to each other.

Remove data ignored by the PDF specification For compatibility with future PDF specification versions, a PDF viewer or printer must accept dictionary keys which are not defined in the PDF specification. These keys can be safely removed without affecting the meaning of the PDF. An example for such a key is /PTEX.Fullbanner emitted by pdf-TEX.

Omit explicitly specified default values The PDF specification provides default values for many dictionary keys. Some PDF generators, however, emit keys with the default value. It is safe to remove these to save space.

Recompress streams with ZIP Uncompressing a stream and recompressing it with maximum-effort ZIP makes the stream smaller most of the time. That's because ZIP is more effective than the other general purpose compression algorithms PDF supports (RLE and LZW). For compatibility with the PostScript language, PDF supports the /ASCIIHexDecode and /ASCII. 85Decode filters on streams. Using them just makes the stream in the file longer (by a factor of about 2/1 and 5/4, respectively). These filters make it possible to embed binary stream data in a pure ASCII PDF file. However, there is no significant use case for an ASCII-only PDF nowadays, so it is recommended to get rid of these filters to decrease to file size.

Remove page thumbnails If the PDF file has page thumbnails, the PDF viewer can show them to the user to make navigation easier and faster. Since page thumbnails are redundant information which can be regenerated any time, it is safe to save space by removing them.

Serialize values more effectively Whitespace can be omitted between tokens, except between a name token and a token starting with a number or a letter (e.g./Ascent 750). Whitespace in front of endstream can be omitted as well. The binary representation of strings should be used instead of the hexadecimal, because it's never longer and it's shorter most of the time if used properly. Only the characters (\) have to be escaped with a backslash within strings, but parentheses which nest can be left unescaped. So, e.g. the string a(( ))(( )\b can be represented as (a(( )\)(\(\\b).

Shrink cross-reference data Renumbering objects (from 1, consecutively) saves space in the crossreference data, because gaps don't have to be encoded. (Each gap of consecutive missing objects costs about 10 bytes.) Also if an object is referenced many times, then giving it a small object number reduces the file size by a few bytes.

Remove old, unused object versions PDF can store old object versions in the file. This makes incremental updates (e.g. the File/Save action in Adobe Acrobat) faster. Removing the old versions save space.

Remove content outside the page /MediaBox, /CropBox and other bounding box values of the page define a rectangle where drawing takes place. All content (vector graphics or parts of it, images or parts of them, or text) than falls outside this rectangle can be removed to save space. Implementing this removal can be tricky for partially visible content. For example, 8-pixel wide bars can be removed from the edge of a JPEG image without quality loss in the remaining part.

Remove unused named destinations A named destination maps a name to a document location or view. It can be a target of a hyperlink within the document, or from outside. Some PDF generator software (such as FrameMaker) generate lots of named destinations never referenced. But care has to be taken when removing those, because then hyperlinks from outside the document wouldn't work.

Flatten structures To facilitate incremental updates, PDF can store some structures (such as the page tree and the content streams within a page) spread to more objects and parts than necessary. Using the simplest, single-level or single-part structure saves space.

3 PDF Size Optimization Tools
3.1 Test PDF Files

In order to compare the optimization effectiveness of the tools presented in this section, we have compiled a set of test PDF files, and optimized them with each tool. The totals column of Table 4 shows the size of each file (the + and − percentages can be ignored for now), and other columns show the bytes used by different object types. Some more details about the test files:

cff 62-page technical documentation about the CFF file format. Font data is a mixture of Type 1, CFF and TrueType. Compiled with Frame- Maker 7.0, PDF generated by Distiller 6.0.1.

beamer1 75 slide-steps long presentation created with beamer.cls. Contains hyperlinks, math formulas, some vector graphics and a few pixelbased images. Compiled with pdf-TEX. Font data is in Type 1 format.

eu2006 126-page conference proceedings (of Euro- TEX 2006) containing some large images. Individual articles were compiled with pdfTEX, and then PDF files were concatenated. Because of the concatenation, many font subsets were embedded multiple times, so a large part of the file is font data. Font data is mostly CFF, but it contains some Type 1 and TrueType fonts as well. Most fonts are compressed with the less effective LZW instead of ZIP.

inkscape 341-page software manual created with codeMantra Universal PDF. Contains lots of screenshots and small images. Font data is a mixture of Type 1, CFF and TrueType.

lme2006 240-page conference proceedings in Hungarian. Contains some black-and-white screenshot images. Individual articles were compiled with LATEX and dvips (without font subsetting), and the PostScript files were concatenated and converted to PDF in a single run of a modified ps2pdf. Since font subsetting was disabled in dvips, later ps2pdf was able to subset fonts without duplication. Font data is in CFF.

pdfref 1310-page reference manual about PDF 1.7 containing quite a lot of duplicate xref tables and XML metadata of document parts. Optimization gets rid of both the duplicate xref tables and the XML metadata. Font data is in CFF. Compiled with FrameMaker 7.2, PDF generated by Acrobat Distiller 7.0.5.

pgf2 560-page software manual about TikZ, with lots of vector graphics as examples, with an outline, without hyperlinks. Compiled with pdf- TEX. Font data is in Type 1 format.

texbook 494-page user manual about TEX (The TEXbook), compiled with pdfTEX. No pixel images, and hardly any vector graphics.

tuzv Mini novel in Hungarian, typeset on 20 A4 pages in a 2-column layout. Generated by dvipdfm. It contains no images or graphics. Font data is in Type 1 format. None of the test PDF files used object streams or cross-reference streams.

3.2 ps2pdf

The ps2pdf script (and its counterparts for specific PDF versions, e.g. ps2pdf14) runs Ghostscript with the flag -sDEVICE=pdfwrite, which converts its input to PDF. Contrary to what the name suggests, ps2pdf accepts not only PostScript, but also PDF files as input.

ps2pdf works by converting its input to lowlevel PostScript drawing primitives, and then emitting them as a PDF document. ps2pdf doesn't intend to be a PDF size optimizer, but it can be used as such. Table 5 shows that ps2pdf increases the file size many times. For the documents cif and pdfref, we got a file size decrease because ps2pdf got rid of some metadata, and for pdfref, it optimized crossreference table. For eu2006 it saved space by recompressing fonts with ZIP. The document tuzv became smaller because ps2pdf converted Type 1 fonts to CFF. The reason for the extremely large growth in beamer1 is that ps2pdf blew up images, and it also embedded multiple instances of the same image as separate images. (It doesn't always do so: if the two instances of the image are close to each other, then ps2pdf reuses the same object in the PDF for representing the image.)

ps2pdf keeps all printable features of the original PDF, and hyperlinks and the document outline as well. However, it recompresses JPEG images (back to a different JPEG, sometimes larger than the original), thus losing quality. The only way to disable this is specifying the flags -dEncodeColor. Images=false-dEncodeGrayImages=false, but it would blow up the file size even more, because it will keep photos uncompressed.

ps2pdf doesn't remove duplicate content (although it removes image duplicates if they are close by), and it also doesn't minimize the use of indirect references (e.g. it emits the /Length of content streams as an indirect reference). The only aspects ps2pdf seems to optimize effectively is converting Type 1 fonts to CFF and removing content outside the page. Since this conversion is also done by pdfsizeopt. py, it is not recommended to use ps2pdf to optimize PDF files.

3.3 PDF Enhancer

PDF Enhancer is commercial software which can concatenate, split, convert and optimize PDF documents, and remove selected PDF parts as well. It has lots of conversion and optimization features, and it is highly configurable. With its default settings, it optimizes the PDF without removing information. It is a feature-extended version of the PDF Shrink software from the same company. A single license for the server edition, needed for batch processing, costs about $1000, and the advanced server edition (with JBIG2 support) costs about twice as much. The standard edition with the GUI costs only $200.

Columns input and pdfe of Table 6 show how effectively PDF Enhancer optimizes. The server edition was used in our automated tests, but the standard edition generates PDF files of the same size. Looking at columns pdfe and a9p4 we can compare PDF Enhancer to Adobe Acrobat Pro. Please note that PDF Enhancer doesn't generate object streams or cross-reference streams, that's why we compare it to a9p4 instead of a9p5 in the table. Feeding the output of PDF Enhancer to Multivalent decreases the file size even further, because Multivalent generates those streams. The column epsom of Table 6 shows the PDF output file sizes of the PDF Enhancer+pdfsizeopt.py+Multivalent combination, which seems to be the most effective for TEX documents.

According to the messages it prints, PDF Enchancer optimizes content streams within the page. Most other optimizers (except for Adobe Acrobat Pro) don't do this. Text-only content streams generated from TEX don't benefit from such an optimization, but for the pgf2 document, which contains lots of graphics, this optimization saved about 10% of the content streams.

It is worth noting that PDF Enhancer failed when optimizing one of the test documents (see in Table 6). The developers of PDF Enhancer reply quickly to bug reports, and they are willing to track and fix bugs in the software.

3.4 Adobe Acrobat Pro

Adobe's WYSIWYG PDF manipulation program, Adobe Acrobat Pro also contains a PDF optimizer (menu item Advanced/PDF Optimizer). A single license of the whole software costs $450; it is not possible to buy only the optimizer. There seems to be no direct way to run the optimizer on multiple files in batch mode. Columns a9p4 and a9p5 of Table 6 shows the effectiveness of the optimizer: values in the column a9p4 are for PDF1.4 output, and column a9p5 belongs to PDF1.5 output. The PDF1.5 files are much smaller because they make use of object streams and cross-reference streams. The optimizer lets the user specify quite a few settings. For the tests we have enabled all optimizations except those which lose information (such as image resampling). It turned out that we had to disable Discard User Data/Discard all comments, forms and multimedia, otherwise the optimizer removed hyperlinks from the document beamer1.

It is worth noting that Adobe Acrobat Pro 9 failed with an image-related error when optimizing document pgf2. Oddly enough, that PDF file doesn't contain any images.

3.5 pdfcompress pdfcompress is the command-line version of the PDF optimizer in Advanced PDF Tools. It is commercial software, a single-computer license costs less than $80. It can resample and recompress images based on a few set of settings for monochrome, gray an color images. It can also recompress streams, and it can remove some PDF features (such metadata, JavaScript, page thumbnails, comments, embedded files, outlines, private data and forms). We haven't analyzed it, because PDF Enhancer seems to have all the features of pdfcompress.

3.6 Multivalent Tool.pdf.Compress

Multivalent is a collection of programs for document viewing, annotation, organization, conversion, validation, inspection, encryption and text extraction (etc.). It supports multiple file formats such as HTML, PDF, DVI and man pages. It is implemented in Java, the 2006 January version is available for download as single .jar file, and it needs Java 1.4 or later. It contains a PDF optimizer, which can be invoked like this at the command-line (without line breaks):

java -cp Multivalent20060102.jar tool.pdf.Compress doc.pdf

This creates the optimized PDF in file doc-o.pdf. If we don't indicate otherwise, by the term Multivalent we mean its PDF optimizer. Although a 2006 January version of Multivalent with full functionality is available for download, Multivalent is not free software or open source. For example, its license allows running the PDF optimizer from the command-line. For other uses of the optimizer, a commercial license has to be acquired. The web site doesn't show details about commercial licenses.

The Multivalent did the following optimizations in 2003: remove object duplicates; recompress LZW to ZIP; generate object streams; generate a cross-reference stream; serialize values more effectively; remove old object versions; remove page thumbnails; remove some obsolete values such as /ProcSet; inline small objects such as stream lengths; remove unused objects; omit default values; shrink cross-reference data. In addition to those above, Multivalent recompresses all streams with maximum-effort ZIP, and it also moves up /MediaBox etc. in the page tree.

Column multi of Table 7 how effectively Multivalent optimizes. The column psom indicates that running pdfsizeopt.py before Multivalent decreases the file size even more most of the time. That's because pdfsizeopt.py can convert Type 1 fonts to CFF, unify CFF font subsets, and it also has a more effective image optimizer than Multivalent.

3.7 pdfsizeopt.py pdfsizeopt.py was written as part of this work. Its purpose is to implement the most common optimizations typical TEX documents benefit from, but only those which are not already done by Multivalent. As described in Section 4, to get the smallest PDF, the optimizations done by pdfsizeopt.py should be applied first, and the result should be processed by Multivalent. The 20060102 version of Multivalent optimizes images, and it replaces the image even if the optimized version is larger than the original, so pdfsizeopt.py implements a final step to put those original images back which are smaller.

pdfsizeopt.py can be used as a stand-alone PDF optimizer (without Multivalent), but the final PDF will be much smaller if Multivalent is run as well.

pdfsizeopt.py is free software licensed under the GPL. It is written in Python. It needs Python 2.4 (or 2.5 or 2.6). It uses only the standard Python modules, but it invokes several external programs to help with the optimizations. These are: Ghostscript (8.61 or newer is recommended), sam2p (0.46 is needed), pngtopnm, tool.pdf.Compress of Multivalent (needs Sun's JDK or OpenJDK), optionally jbig2, optionally PNGOUT. Most of these are free software, except for the Multivalent tools, which are not free software or open source, but they can be downloaded and used on the command line free of charge; for other uses they have to be licensed commercially. PNGOUT is not free software or open source either, but the binaries available free of charge can be used without restriction.

pdfsizeopt.py implements these PDF size optimization methods:

Convert Type 1 fonts to CFF It is done by generating a PostScript document with all fonts, converting it to PDF with Ghostscript (just like ps2pdf), and extracting the CFF fonts from the PDF. Another option would be to use dvipdfmx, which can read Type 1 fonts, and emit them as CFF fonts. Please note that Ghostscript inlines subroutines (/Subrs) in the Type 1 font, so the CFF becomes larger—but we are compressing the font with ZIP anyway, which eliminates most of the repetitions.

Unify subsets of the same CFF font Ghostscript is used for parsing CFF to a font dictionary, and also for serializing the modified dictionary as CFF. Again, the latter is done by generating a PostScript file with all the fonts, then converting it to a PDF using Ghostscript. Limitations: it only works for CFF (and former Type 1) fonts; it doesn't unify fonts with different names; it won't unify some fonts if one of them has slightly different metrics.

Convert inline images to objects We need this because most tools (including pdfsizeopy.py) do not optimize inline images. Limitations: it only detects inline images generated by sam2p; it only detects inline images within a form XObject (not in a content stream).

Optimize individual images First the data gets decompressed (with Ghostscript if the image data is compressed with anything other than simple ZIP), then it is recompressed with higheffort ZIP, then it is converted to PNG, then several external PNG compressors are run to get the optimized PNG, and finally the smallest representation (among on the optimized PNG files, intermediate images and the original image) is picked, i.e. the one with the smallest PDF image object representation, counting the stream dictionary and the compressed stream as well. The following PNG optimizers are used: sam2p without predictor, sam2p with PNG predictor, PNGOUT (very slow, but generates a few percent smaller PNG files) and jbig2 (only for bilevel images). Limitations: no CMYK support; no device-independent color space support (only RGB with or without palette and grayscale is supported); no images with an alpha channel; only some types of transparency; images lossy compression (JPEG or JPEG2000) are not optimized.

Remove object duplicates Equivalence classes are used, so duplicate subtrees referring to objects between themselves or each other are also removed. (Multivalent also has this feature.)

Remove image duplicates Images are compared based on RGB pixel data, so duplicates using a different compression or color space or bitsper-component are also detected and removed. This is useful if the PDF is a concatenation of PDF files in the same collection, each PDF compiled with a different method, and then concatenated. The newest version of sam2p (0.46) produces exactly the same output file for two images with identical RGB pixel data, so image duplicates are identified by comparing the files created by sam2p. There are also several early checks in the optimization algorithm to detect the duplicate before wasting time on running the many different optimizers.

Remove unused objects All objects unreachable from the trailer object are removed.

Serialize values more effectively Extra spaces are removed; hex strings are converted to binary; strings are serialized without extra backslashes; comments are removed; garbage between object definitions is removed; gaps in the cross-reference table are removed; objects with high reference counts are given low numbers.

The column pso of Table 7 shows how effectively pdfsizeopt.py optimizes. The column psom shows the combined effectiveness of pdfsizeopt.py+Multivalent. Please note that it is not with and with running pdfsizeopt.py alone, because pdfsizeopt.py was designed to do only those optimizations which Multivalent does not provide (or, such as image compression, does suboptimally). On the other hand, it is almost always worth running pdfsizeopt.py before Multivalent, rather than running Multivalent alone. The only exception we could find was the document pdfref, where the combined approach yielded a 0.02% larger file size.

pdfsizeopt.py can count the total byte size of various object types in a PDF. Table 4 shows the results on our test PDF files. The percentages in the table cells are savings by running pdfsizeopt.py+Multivalent. Although it is not visible in the table, most of the savings come from Multivalent, except in the font and image columns, where the contributions of pdfsizeopt.py are important. The large font savings for the document tuzv are because the document is short and it contains many Type 1 fonts. For the document eu2006 we get an even larger saving, because there was lots of glyph duplication across the articles in the collection, and also because LZW was used instead of ZIP to compress the fonts. Only a few of our test documents benefit from image optimization, and even there the contribution of dfsizeopt.py is small because the original PDF contains the images emitted effectively, and also Multivalent does a decent (though suboptimal) job at image optimization. So for the document eu2006 Multivalent alone saves about 1.55%, and pdfsizeopt.py alone saves 6.14%. (There is no data on the extra size reduction by combining the two tools, because pdfsizeopt.py disables Multivalent's image optimizations since most images won't benefit.) For the document lme2006 Multivalent alone saves 3.41%, and pdfsizeopy.py alone saves 6.39%. The document inkscape benefits most from image recompression: Multivalent alone saves 19.87%, and pdfsizeopy.py alone saves 20.35%.

Columns psom, apsom and epsom of Table 6 show that optimizing with PDF Enhancer or Adobe Acrobat Pro before running the pdfsizeopt.py+Multivalent combination almost always decreases the file size, sometimes by a few percent, but in case of document beamer1 the extra gain of running PDF enhancer first was 6.46%. It seems that for TEX documents PDF Enahncer (with the combination) is the more effective, and Adobe Acrobat Pro is more effective other documents. See ideas for improving pdfsizeopt.py in Section 6.

4 Suggested PDF Optimization Workflow

Based on the optimization tests in Section 3 we suggest the following PDF generation and optimization workflow:

1. Upgrade Ghostscript to at least 8.61, and upgrade to TEXLive 2008.
2. For TEX documents, create the PDF using pdf-TEX or dvipdfmx, with the settings discussed in Subsection 2.1. Use dvips+ps2pdf only if absolutely necessary, because of the large PDF files it produces.
3. Use pdftk or Multivalent's PDF merge tool to concatenate PDF files if necessary. Pay attention to the hyperlinks and the document outline after concatenation. Don't concatenate with Ghostscript, because that it would blow up the file size.
4. If you have access to PDF Enhancer, optimize the PDF with it. Otherwise, if you have access to Adobe Acrobat Pro, optimize the PDF with it.
5. Optimize the PDF with pdfsizeopt.py, including the last step of running Multivalent as well. Most of the optimization steps above can be fully automated and run in batch, except if Adobe Acrobat Pro is involved.

5 Related Work

There are several documents discussing PDF optimization. Most of those are present is this work as well.

Since web browsers can display PNG images, several PNG optimization tools have been developed to reduce web page loading times. These tools can be used for optimizing (mainly nonphoto) images in PDF documents as well. But since PDF has a more generic image and compression model than PNG, it would be possible to save a little bit more by developing PDF-specific tools, which take advantage of e.g. using the TIFF predictor and ZIP compression together.

An alternative document file format is DjVu, whose most important limitation compared to PDF is that it doesn't support vector graphics. Due to the sophisticated image layer separation and compression, the size of a 600 DPI DjVu file is comparable to the corresponding optimized PDF document: if the PDF contains text with embedded vector fonts and vector graphics, the DjVu file can be about 3 times larger than the PDF. If the PDF contains mainly images (such as a sequence of scanned sheets), the DjVu file will become slightly smaller than the PDF. Of course these ratios depend on the software used for encoding as well. There are only a few DjVu encoders available: pdf2djvu and djvudigital are free, and Document Express is a commercial application. PDF is more complex than DjVu: the PDF1.7 reference itself is 1310 pages long, and it relies on external specifications such as ZIP, JBIG2, G3 fax, JPEG, JPEG2000, Type 1, CFF, TrueType, OpenType, CMap, CID font, XML, OPI, DSA, AES, MD5, SHA-1, PKCS, PANOSE, ICC color profiles, JavaScript and more. PDF1.7 became an ISO standard in 2008, which adds additional long documents. Having to understand many of these makes PDF viewers hard to implement and complex. This problem can become more severe for long-term archiving if we want to view a PDF 20 or 50 years from now, maybe today's PDF viewers won't work on future architectures, so we have to implement our own viewer. In contrast, the DjVu specification is only 71 pages long, and more self-contained. Since the DjVu file format uses very different technologies than PDF, one can archive both the PDF and the DjVu version of the same document, in case a decent renderer won't be available for one of the formats decades later.

The PDF Database contains more than 500 PDF documents by various producers, with different sizes and versions. These PDF files can be used can be used for testing PDF parsers and optimizers. Multivalent introduced the custom file format compact PDF, which is about 30% to 60% smaller than a regular PDF. The disadvantage is that only Multivalent can read or write this format so far (but it supports fast and lossless conversion to regular PDF). Compact PDF achieves the size reduction by grouping similar objects next to each other, and compressing the whole document as one big stream with bzip2, which is superior to ZIP. Another improvement is that compact PDF stores Type 1 fonts unencrypted, with boilerplate such as the 512-byte font tailer and random bytes for encryption stripped out.

6 Conclusion and Future Work

Since it is not the primary goal for most PDF generators to emit the smallest possible PDF, simple techniques done by Multivalent and pdfsizeopt.py can yield significant size reduction (up to a factor of 3) depending on the generator and the PDF features used in the document. Rearranging the drawing instructions (contents streams and form XObjects; as done by Adobe Acrobat Pro and PDF Enhancer) is a more complicated optimization, and saves some more space in addition to the simple techniques. It also matters how the PDF was generated (e.g. pdfTEX generates a smaller and more optimizable PDF than dvips+ps2pdf).

The workflow proposed in this article has too many dependencies. Python (for pdfsizeopt.py) and Java (for Multivalent) runtimes, and Ghostscript (needed by pdfsizeopt.py for Type 1 and CFF font parsing, CFF generation and arbitrary stream filtering) are the most heavy ones. It is possible to get rid of these by reimplementing pdfsizeopt.py from scratch. To get rid of Python, we could use Lua, and build a statically linked C binary with the Lua interpreter, zlib and all the Lua bytecode linked in. We could reimplement the optimizations done by Multivalent in Lua. (This would include reading and writing object streams and cross-reference streams.) Gradually we could move some functionality to C or C++ code to speed up the optimizer. We could reuse the xpdf codebase to be able to use all PDF filters without invoking Ghostscript. We would have to implement Type 1 and CFF parsing and CFF generation, possibly relying on the dvipdfmx codebase. Other dependencies such as jbig2, sam2p, pngtopnm, PNGOUT and PDF Enhancer are not so problematic, because they can be compiled to small, statically linked, stand-alone executables.)

Some optimizations of pdfsizeopt.py could be generalized to cover more cases. Examples are: add CMYK image optimization; make CFF matching more permissive (before unification); recognize more inline images (not only those created by sam2p, and not only in form XObjects). pdfsizeopt.py would also benefit from compiling a test set of PDF files (possibly based on the PDF Database), and adding a framework which automatically checks that pdfsizeopt.py detected the opportunity to optimize, and did the optimization properly in each case.

When preparing a collection (such as a journal volume or a conference proceedings) with TEX, in a typical workflow individual articles are compiled to PDF, and the PDF files are then concatenated. The concatenated document can be optimized using pdfsizeopt.py+Multivalent to get rid of redundancy (such as duplicate glyphs in fonts and duplicate images) across articles. Not all concatenators can preserve hyperlinks and the document outline for TEX documents. Adding concatenation support to pdfsizeopt.py would make creating small and interactive collections more straightforward.

Figure 3:
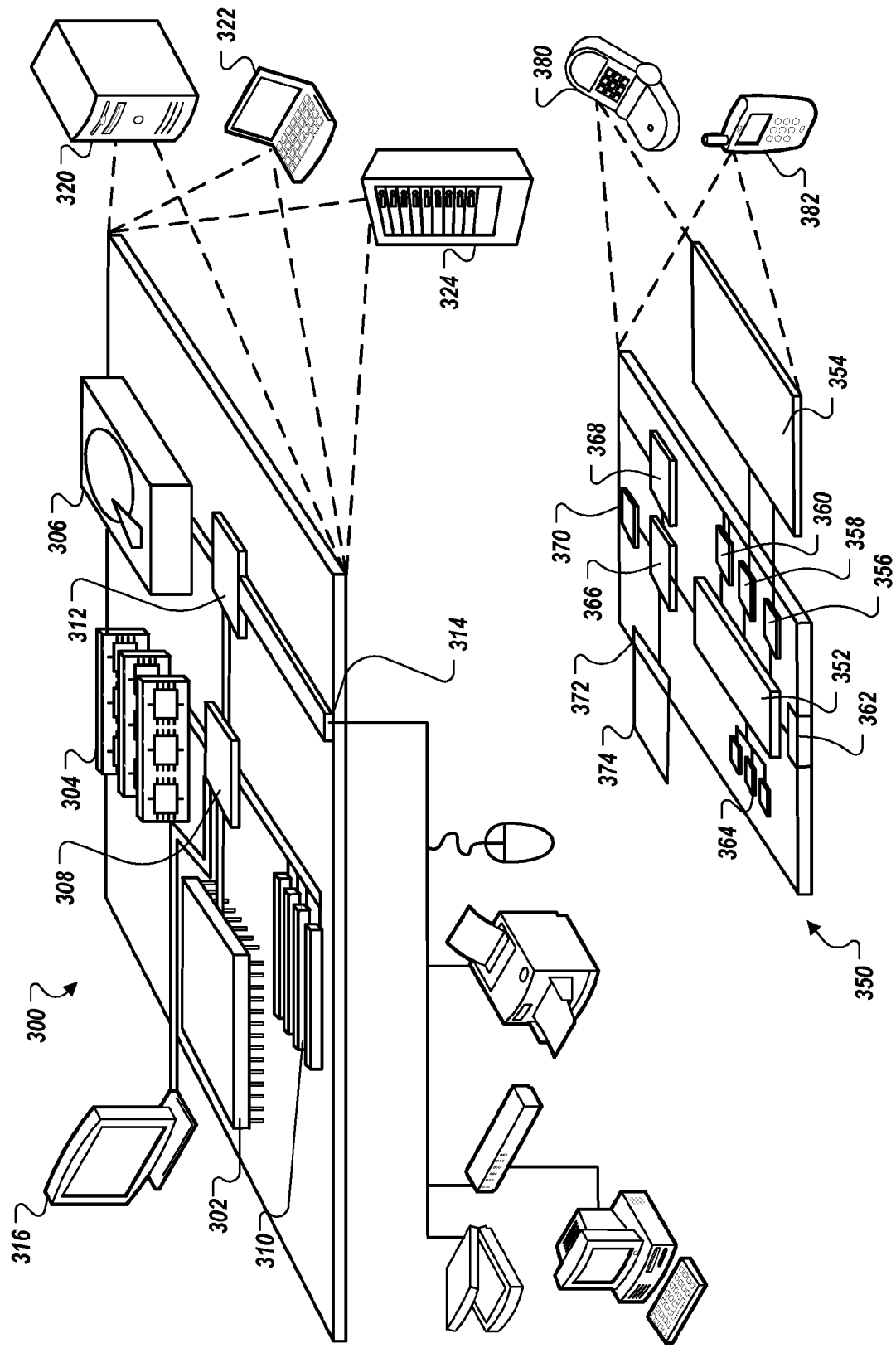
FIG. 3 shows an example of a computer device and a mobile computer device that can be used to implement the techniques described here.

FIG. 3 shows an example of a generic computer device 300 and a generic mobile computer device 350, which may be used with the techniques described here. For example, the devices 300 and 350 may be used to read a PDF or other format of file, and may be used to generate a PDF-format file from another format and/or to make a PDF-format file smaller, i.e., to optimize such a file.

Computing device 300 is intended to represent various forms of digital computers, such as laptops, desktops, workstations, personal digital assistants, servers, blade servers, mainframes, and other appropriate computers. Computing device 350 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 300 includes a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various busses, and may be mounted on a common motherboard or in other manners as appropriate. The processor 302 can process instructions for execution within the computing device 300, including instructions stored in the memory 304 or on the storage device 306 to display graphical information for a GUI on an external input/output device, such as display 116 coupled to high speed interface 308. In other implementations, multiple processors and/or multiple buses may be used, as appropriate, along with multiple memories and types of memory. Also, multiple computing devices 300 may be connected, with each device providing portions of the necessary operations (e.g., as a server bank, a group of blade servers, or a multi-processor system).

The memory 304 stores information within the computing device 300. In one implementation, the memory 304 is a volatile memory unit or units. In another implementation, the memory 304 is a non-volatile memory unit or units. The memory 304 may also be another form of computer-readable medium, such as a magnetic or optical disk.

The storage device 306 is capable of providing mass storage for the computing device 300. In one implementation, the storage device 306 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 304, the storage device 306, or memory on processor 302.

The high speed controller 308 manages bandwidth-intensive operations for the computing device 300, while the low speed controller 312 manages lower bandwidth-intensive operations. Such allocation of functions is exemplary only. In one implementation, the high-speed controller 308 is coupled to memory 304, display 316 (e.g., through a graphics processor or accelerator), and to high-speed expansion ports 310, which may accept various expansion cards (not shown). In the implementation, low-speed controller 312 is coupled to storage device 106 and low-speed expansion port 314. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 300 may be implemented in a number of different forms, as shown in the figure. For example, it may be implemented as a standard server 320, or multiple times in a group of such servers. It may also be implemented as part of a rack server system 324. In addition, it may be implemented in a personal computer such as a laptop computer 322. Alternatively, components from computing device 300 may be combined with other components in a mobile device (not shown), such as device 350. Each of such devices may contain one or more of computing device 300, 350, and an entire system may be made up of multiple computing devices 300, 350 communicating with each other.

Computing device 350 includes a processor 352, memory 364, an input/output device such as a display 354, a communication interface 366, and a transceiver 168, among other components. The device 350 may also be provided with a storage device, such as a microdrive or other device, to provide additional storage. Each of the components 350, 352, 364, 354, 366, and 368, are interconnected using various buses, and several of the components may be mounted on a common motherboard or in other manners as appropriate.

The processor 352 can execute instructions within the computing device 350, including instructions stored in the memory 364. The processor may be implemented as a chipset of chips that include separate and multiple analog and digital processors. The processor may provide, for example, for coordination of the other components of the device 350, such as control of user interfaces, applications run by device 350, and wireless communication by device 350.

Processor 352 may communicate with a user through control interface 158 and display interface 356 coupled to a display 354. The display 354 may be, for example, a TFT LCD (Thin-Film-Transistor Liquid Crystal Display) or an OLED (Organic Light Emitting Diode) display, or other appropriate display technology. The display interface 356 may comprise appropriate circuitry for driving the display 354 to present graphical and other information to a user. The control interface 358 may receive commands from a user and convert them for submission to the processor 352. In addition, an external interface 362 may be provide in communication with processor 352, so as to enable near area communication of device 350 with other devices. External interface 362 may provide, for example, for wired communication in some implementations, or for wireless communication in other implementations, and multiple interfaces may also be used.

The memory 364 stores information within the computing device 350. The memory 364 can be implemented as one or more of a computer-readable medium or media, a volatile memory unit or units, or a non-volatile memory unit or units. Expansion memory 374 may also be provided and connected to device 350 through expansion interface 372, which may include, for example, a SIMM (Single In Line Memory Module) card interface. Such expansion memory 374 may provide extra storage space for device 350, or may also store applications or other information for device 350. Specifically, expansion memory 374 may include instructions to carry out or supplement the processes described above, and may include secure information also. Thus, for example, expansion memory 374 may be provide as a security module for device 350, and may be programmed with instructions that permit secure use of device 350. In addition, secure applications may be provided via the SIMM cards, along with additional information, such as placing identifying information on the SIMM card in a non-hackable manner.

The memory may include, for example, flash memory and/ or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 364, expansion memory 374, memory on processor 352, or a propagated signal that may be received, for example, over transceiver 368 or external interface 362.

Device 350 may communicate wirelessly through communication interface 366, which may include digital signal processing circuitry where necessary. Communication interface 366 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 368. In addition, short-range communication may occur, such as using a Bluetooth, WiFi, or other such transceiver (not shown). In addition, GPS (Global Positioning System) receiver module 370 may provide additional navigation- and location-related wireless data to device 350, which may be used as appropriate by applications running on device 350.

Device 350 may also communicate audibly using audio codec 360, which may receive spoken information from a user and convert it to usable digital information. Audio codec 360 may likewise generate audible sound for a user, such as through a speaker, e.g., in a handset of device 350. Such sound may include sound from voice telephone calls, may include recorded sound (e.g., voice messages, music files, etc.) and may also include sound generated by applications operating on device 350.

The computing device 350 may be implemented in a number of different forms, as shown in the figure. For example, it may be implemented as a cellular telephone 380. It may also be implemented as part of a smartphone 382, personal digital assistant, or other similar mobile device.

TABLE 2

Features supported by various PDF output methods

| Feature | pdfTEX | dvipdfm(x) | dvips |
|---|---|---|---|
| hyperref | + | + | + |
| TtkZ | + | + | + |
| beamer.cls | + | +$^o$ | +$^u$ |
| include PDF | + | +$^b$ | + |
| embed bitmap font | + | + | + |
| embed Type 1 font | + | + | + |
| embed TrueType font | + | + | − |
| include EPS | − | + | + |
| include JPEG | + | +$^x$ | − |
| include PNG | + | +$^x$ | − |
| include METAPOST | +$^m$ | +$^m$ | +$^r$ |
| psfrag | −$^f$ | −$^f$ | + |
| Pstricks | −$^f$ | −$^f$ | + |
| pdfpages | + | − | − |
| line break in link | + | + | − | b: bounding box detection with ebb or pts-graphicshelper f: see Workarounds for PDF output with the pstricks LATEX package. URL http://tug.org/ PSTricks/ main.cgi?file=pdf/pdfoutput, for workarounds m: convenient with \includegraphicsmps defined in pts-graphics-helper r: rename file to .eps manually o: with \documentclass[dvipdfm]{beamer} u: use dvips -t unknown doc.dvi to get the paper size right.

x: with \usepackage[dvipdfmx]{graphics} and shell escape running extractbb pdfTEX

TABLE 1

Output file sizes of PDF generation from The TEXbook, with various methods. The PDF was optimized with pdfsizeopt.py, then with Multivalent

| method | PDF bytes | optimized PDF bytes |
|---|---|---|
| pdfTEX | 2283510 | 1806887 |
| dvipdfm | 2269821 | 1787039 |
| dvipdfmx | 2007012 | 1800270 |
| dvips+ps2pdf | 3485081 | 3181869 |

TABLE 3

Font .map files used by various drivers and their symlink targets (default first) in TEXLive 2008

| Driver | Font .map file |
|---|---|
| xdvi | ps2pk.map |
| dvips | psfonts.map → psfonts_t1.map | (psfonts_pk.map) |
| pdfTEX | pdftex.map → pdftex_dl14 | (pdftex_ndl14.map) |
| dvipdfm(x) | Dvipdfm.map → Dvipdfm_dl14.map | (dvipdfm_ndl14.map) |

TABLE 4

PDF size reduction by object type, when running pdfsizeopy.py + Multivalent document contents font image

| document | contents | font | image | other | xref | total |
|---|---|---|---|---|---|---|
| cff | 141153-02% | 25547-02% | 0 | 178926-91% | 174774-100% | 521909-65% |
| beamer | 169789-03% | 44799-54% | 115160-00% | 445732-96% | 56752-98% | 832319-62% |
| eu2006 | 1065864-01% | 5271206-91% | 3597779-03% | 430352-80% | 45792-94% | 8411464-43% |
| inkscape | 10679156-29% | 230241-00% | 6255203-20% | 943269-79% | 122274-94% | 18245172-24% |
| lme2006 | 1501584-14% | 314265-73% | 678549-06% | 176666-91% | 31892-93% | 2703119-25% |
| pdfref | 6269878-05% | 274231-04% | 1339264-00% | 17906915-79% | 6665536-100% | 32472771-65% |
| pgf2 | 2184323-03% | 275768-51% | 0 | 1132100-84% | 190832-96% | 3783193-36% |
| texbook | 1567901-01% | 519550-48% | 0 | 217616-84% | 35532-87% | 2280769-21% |
| tuzv | 112145-03% | 201155-84% | 0 | 21913-77% | 2471-88% | 337764-57% |

The first number in each cell is the amount of bytes used in the original document. The - . . . % value indicates the percentage saved by optimization. The data in this table was extracted from the original and optimized PDF files using pdfsizeopy.py—stats.
 contents: content streams
 font: embedded font files
 image: pixel-based image objects and inline images, the latter created by sam2p
 other: other objects
 xref: cross-reference tables or streams
 total: size of the PDF file

TABLE 5

PDF optimization effectiveness of ps2pdf

| document | input | ps2pdf | psom |
|---|---|---|---|
| cff | 521909 | 264861 | 180987 |
| beamer1 | 832319 | 3027368 | 317351 |
| eu2006 | 8411464 | 6322867 | 4812306 |
| inkscape | 18245172 | failed | 13944481 |
| lme2006 | 2703119 | 3091842 | 2033582 |
| pdfref | 32472771 | 15949169 | 11237663 |
| pgf2 | 3783193 | 4023581 | 2438261 |
| texbook | 2280769 | 2539424 | 1806887 |
| tuzv | 337764 | 199279 | 146414 |

All numeric values are in bytes. Italic values indicate that the optimizer increased the file size.
 ps2pdf: Ghostscript 8.61 run as
 ps2pdf14-dPDFSETTINGS=/prepress
 psom: pdfsizeopt.py+Multivalent

TABLE 6

PDF optimization effectiveness of PDF Enhancer and Adobe Acrobat Pro

| document | input | pdfe | epsom | psom | apsom | a0p4 | a9p5 |
|---|---|---|---|---|---|---|---|
| cff | 521909 | 229953 | 174182 | 180987 | 158395 | 548181 | 329315 |
| beamer1 | 832319 | 756971 | 296816 | 317351 | 317326 | 765785 | 363963 |
| eu2006 | 8411464 | failed | n/a | 4812306 | 3666315 | 8115676 | 7991997 |
| inkscape | 18245172 | 14613044 | 12289136 | 13944481 | 11807680 | 14283567 | 13962583 |
| lme2006 | 2703119 | 2263227 | 1781574 | 2033582 | 1830936 | 2440693 | 2279985 |
| pdfref | 32472771 | 23794114 | 11009960 | 11237663 | 9360794 | 23217668 | 20208419 |
| pgf2 | 3783193 | 3498756 | 2245797 | 2438261 | n/a | failed | failed |
| texbook | 2280769 | 2273410 | 1803146 | 1806887 | 1804565 | 2314025 | 2150899 |
| tuzv | 337764 | 338316 | 147453 | 146414 | 150813 | 344215 | 328843 |

All numeric values are in bytes. Italic values indicate that the optimizer increased the file size.
 pdfe: PDF Enhancer 3.2.5 (1122r) server edition
 epsom: PDF Enhancer+pdfsizeopt.py+Multivalent
 psom: pdfsizeopt.py+Multivalent
 apsom: Adobe Acrobat Pro 9 creating PDF1.4+pdfsizeopt.py+Multivalent
 a9p4: Adobe Acrobat Pro 9 creating PDF1.4
 a9p5: Adobe Acrobat Pro 9 creating PDF1.5

TABLE 7

PDF optimization effectiveness of Multivalent and pdfsizeopt.py

| document | input | multi | psom | pso |
|---|---|---|---|---|
| cff | 521909 | 181178 | 180987 | 230675 |
| beamer1 | 832319 | 341732 | 317351 | 443253 |
| eu2006 | 8411464 | 7198149 | 4812306 | 4993913 |
| inkscape | 18245172 | 13976597 | 13944481 | 17183194 |

TABLE 7-continued

PDF optimization effectiveness of Multivalent and pdfsizeopt.py

| document | input | multi | psom | pso |
|---|---|---|---|---|
| lme2006 | 2703119 | 2285956 | 2033582 | 2349035 |
| pdfref | 32472771 | 11235006 | 11237663 | 23413875 |
| pgf2 | 3783193 | 2584180 | 2438261 | 3449386 |
| texbook | 2280769 | 2057755 | 1806887 | 1992958 |
| tuzv | 337764 | 314508 | 146414 | 166863 |

All numeric values are in bytes. The Italic value indicates that Multivalent alone was better than with pdfsizeopt.py.
 multi: Multivalent 20060102 tool.pdf.Compress
 psom: pdfsizeopt.py+Multivalent
 pso: pdfsizeopt.py without Multivalent

What is claimed:

1. A computer-implemented method for formatting electronic documents, comprising:
 receiving, at a computer system, a source version of an electronic document in a source format, where one or more Type 1 fonts are embedded in the source version of the electronic document;
 processing the source version of the electronic document by unifying object duplicates in the electronic document to generate a target version of the electronic document in a target format, the target version of the electronic document in the target format excluding one of each of the object duplicates; and
 outputting the target version of the electronic document in a target format,
 wherein unifying object duplicates comprises:
  detecting content duplication at a sub-object level;
  extracting duplicated content as individual objects;
  compressing one or more images embedded in the source version of the electronic document,
  compressing one or more Type 1 fonts embedded in the source version of the electronic document, and
  unifying object duplicates embedded in the source version of the electronic document.

2. The method of claim 1, wherein the target format is a compressed version of the source format.

3. The method of claim 1, wherein the source format and the target format are both portable document format (PDF).

4. The method of claim 1, where the received source version of the electronic document is a previously compressed electronic document.

5. The method of claim 1, wherein the received source version of the document is in a TEX format and the target version of the electronic document is output in a portable document format (PDF) format.

6. The method of claim 1, wherein processing the source version of the electronic document comprises performing two or more operations selected from a group consisting of generating object streams and cross-reference streams based on the source version of the electronic document, encoding Type 1 fonts from the source version of the electronic document as CFF, creating graphics based on font subsetting factors and the source version of the electronic document, disabling font subsetting before concatenation of the source version of the electronic document, and embedding each graphics file from the source version of the electronic document once.

7. The method of claim 1, wherein processing the source version of the electronic document comprises further applying to the electronic document a plurality of publicly available applications in a predetermined sequence, and supplying an output from one of the plurality of publicly available applications to a next of the plurality of publicly available applications.

8. A non-transitory computer-readable storage memory device having recorded thereon instructions that, when executed, cause a processor to perform operations that comprise:
   receiving, at a computer system, a source version of an electronic document in a source format, where one or more Type 1 fonts are embedded in the source version of the electronic document;
   processing the electronic document by unifying object duplicates in the electronic document to generate a target version of the electronic document in a target format, the target version of the electronic document in the target format excluding one of each of the object duplicates; and
   outputting the target version of the electronic document in the target format,
   wherein unifying object duplicates comprises:
      detecting content duplication at a sub-object level;
      extracting the duplicated content to individual objects;
      compressing one or more images embedded in the source version of the electronic document,
      compressing one or more Type 1 fonts embedded in the source version of the electronic document, and
      unifying object duplicates embedded in the source version of the electronic document.

9. The non-transitory computer-readable storage memory device of claim 8, wherein the target format is a compressed version of the source format.

10. The non-transitory computer-readable storage memory device of claim 8, wherein the source format and the target format are both portable document format (PDF).

11. The non-transitory computer-readable storage memory device of claim 8, where the received source version of the electronic document is a previously compressed electronic document.

12. The non-transitory computer-readable storage memory device of claim 8, wherein the source version of the document is in a TEX format and the target version of the document is in a portable document format (PDF) format.

13. The non-transitory computer-readable storage memory device of claim 8, wherein processing the source version of the electronic document comprises performing two or more operations selected from a group consisting of generating object streams and cross-reference streams based on the source version of the electronic document, encoding Type 1 fonts from the source version of the electronic document as CFF, creating graphics based on font subsetting factors and the source version of the electronic document, disabling font subsetting before concatenation of the source version of the electronic document, and embedding each graphics file from the source version of the electronic document once.

14. The non-transitory computer-readable storage memory device of claim 8, wherein processing the source version of the electronic document comprises applying to the electronic document a plurality of publicly available applications in a predetermined sequence, and supplying an output from one of the plurality of publicly available applications to a next of the plurality of publicly available applications.

15. A computer-implemented system, comprising:
   one or more computer processors;
   a non-transitory tangible memory device storing instructions that are accessible to the one or more processors, the instructions, when executed, causing the one or more processors to perform operations that comprise:
      receiving, at a computer system, a source version of an electronic document in a source format, where one or more Type 1 fonts are embedded in the source version of the electronic document;
      processing the electronic document by unifying object duplicates in the electronic document to generate a target version of the electronic document in a target format, the target version of the electronic document in the target format excluding one of each of the object duplicates; and
      outputting the target version of the electronic document in the target format based on the processing,
   wherein unifying object duplicates comprises:
      detecting content duplication at a sub-object level;
      extracting the duplicated content to individual objects;
      compressing one or more images embedded in the source version of the electronic document,
      compressing one or more Type 1 fonts embedded in the source version of the electronic document, and
      unifying object duplicates embedded in the source version of the electronic document.

16. The computer-implemented system of claim 15, wherein unifying object duplicates comprises unifying subsets of a same font.

17. The computer-implemented system of claim 15, wherein unifying object duplicates comprises:
   constructing equivalence classes of more than one object; and
   unifying the more than one object into only one object per class.

18. The computer-implemented system of claim 15, wherein unifying object duplicates comprises:
   identifying two different representations of the same image in the source version of the electronic document in the source format;
   removing a larger of the two different representations of the same image; and
   updating references to a smaller of the two different representations.

19. The computer-implemented system of claim 15, wherein the operations further comprise excluding base 14 fonts from the output electronic document.

20. The computer-implemented system of claim 15, wherein the operations further comprise defining at least one graphic in the target version of the electronic document in a format that avoids duplicating fonts that are embedded in the main portion of the target version of the electronic document.

21. The computer-implemented system of claim 15, wherein the operations further comprise:
   concatenating non-stream objects to an object stream; and
   compressing the object stream.

22. The computer-implemented system of claim 15, wherein the operations further comprise sorting the non-stream objects by type prior to the concatenating and the compressing.

23. The computer-implemented system of claim 15, wherein compressing the sizes of the one or more Type 1 fonts in the source version of the electronic document comprises embedding vector fonts rather than bitmap fonts into the target version of the electronic document.

\* \* \* \* \*

UNITED STATES PATENT AND TRADEMARK OFFICE
CERTIFICATE OF CORRECTION

| | | |
|---|---|---|
| PATENT NO. | : 8,433,997 B1 | Page 1 of 1 |
| APPLICATION NO. | : 12/848787 | |
| DATED | : April 30, 2013 | |
| INVENTOR(S) | : Peter Szabo | |

It is certified that error appears in the above-identified patent and that said Letters Patent is hereby corrected as shown below:

On the Title Page, Item [56]:

In the List of References:

Page 2, column 2 (Other Publications), line 8, delete "apend." and insert -- append. --, therefor.

In the Claims:

Column 30, line 61, in Claim 4, delete "where" and insert -- wherein --, therefor.

Column 31, line 51, in Claim 11, delete "where" and insert -- wherein --, therefor.

Signed and Sealed this
Thirtieth Day of July, 2013

Teresa Stanek Rea
*Acting Director of the United States Patent and Trademark Office*